(12) United States Patent
Warashina et al.

(10) Patent No.: US 10,982,774 B2
(45) Date of Patent: Apr. 20, 2021

(54) CONTROL VALVE AND METHOD FOR MANUFACTURING CONTROL VALVE

(71) Applicant: HAMANAKODENSO CO., LTD., Kosai (JP)

(72) Inventors: Tomoaki Warashina, Kosai (JP); Takao Ishida, Kosai (JP)

(73) Assignee: HAMANAKODENSO CO., LTD., Shizuoka-Pref. (JP)

( * ) Notice: Subject to any disclaimer, the term of this patent is extended or adjusted under 35 U.S.C. 154(b) by 0 days.

(21) Appl. No.: 16/459,688

(22) Filed: Jul. 2, 2019

(65) Prior Publication Data
US 2020/0011428 A1 Jan. 9, 2020

(30) Foreign Application Priority Data

Jul. 5, 2018 (JP) .............................. JP2018-128496

(51) Int. Cl.
*F16K 11/044* (2006.01)
*F16K 1/36* (2006.01)
*F16K 1/42* (2006.01)

(52) U.S. Cl.
CPC .................. *F16K 1/36* (2013.01); *F16K 1/42* (2013.01); *F16K 11/044* (2013.01)

(58) Field of Classification Search
CPC ...... F16K 11/044; F16K 11/04; F16K 11/065; F16K 11/07; F16K 31/0603; F16K 31/0624; F16K 31/0627; F16K 31/0655; F16K 31/0693; F16K 31/0686; F16K 31/0675; F16K 31/42; F16K 39/022; Y10T 137/87708; Y10T 137/87772; Y10T 137/87217; Y10T 137/87209; Y10T 137/86622; F16H 61/009; F16H 2061/0253; F16H 2061/0258; F01L 2001/3443

See application file for complete search history.

(56) References Cited

U.S. PATENT DOCUMENTS 4,240,468 A * 12/1980 Brand .................. F16K 31/0651
137/332
4,242,116 A * 12/1980 Aschberger ......... F16K 31/0606
137/625.5

(Continued)

FOREIGN PATENT DOCUMENTS

JP 2017-096379 A 6/2017

OTHER PUBLICATIONS

U.S. Appl. No. 16/459,727, filed Jul. 2, 2019, Warashina et al.

*Primary Examiner* — Hailey K. Do
(74) *Attorney, Agent, or Firm* — Harness, Dickey & Pierce, P.L.C.

(57) ABSTRACT

A control valve includes a housing, a valve body arranged in a valve chamber of the housing, and a support member fixed to the housing and supporting the valve body in the valve chamber. The valve body has a tubular shape into which the support member is inserted, and the valve body is slidable on the support member between a first position to close an inlet passage and a second position to close a drain passage. The valve body includes a skin layer forming an outer surface of the valve body, and a core layer under the skin layer. The outer surface of the valve body includes a core exposed portion where the core layer is exposed without being covered with the skin layer.

9 Claims, 11 Drawing Sheets

(56) References Cited

U.S. PATENT DOCUMENTS

| | | | | |
|---|---|---|---|---|
| 4,553,735 A | * | 11/1985 | Brundage | F16K 31/0655 |
| | | | | 137/454.5 |
| 5,139,227 A | * | 8/1992 | Sumida | F16K 31/0655 |
| | | | | 251/129.08 |
| 2017/0122455 A1 | * | 5/2017 | Warashina | F16K 3/246 |
| 2017/0146149 A1 | | 5/2017 | Warashina et al. | |
| 2018/0195635 A1 | * | 7/2018 | Warashina | F16K 31/0675 |

* cited by examiner

CONTROL VALVE AND METHOD FOR MANUFACTURING CONTROL VALVE

CROSS REFERENCE TO RELATED APPLICATION

The present application claims the benefit of priority from Japanese Patent Application No. 2018-128496 filed on Jul. 5, 2018. The entire disclosure of the above application is incorporated herein by reference.

TECHNICAL FIELD

The present disclosure relates to a control valve and a method for manufacturing a control valve.

BACKGROUND

A control valve switches between a downstream passage and a drain passage as an outflow destination of working fluid which has flowed into a valve chamber from an upstream passage.

SUMMARY

According to a first aspect of the present disclosure, a control valve controls a flow of a working fluid. The control valve includes a housing, an inlet passage, a valve body and a support member. The housing includes a tubular end portion inserted into a mounting hole of a passage formation member, a drain passage through which the working fluid is discharged from the housing to an outside of the passage formation member, and a valve chamber inside the tubular end portion. The passage formation member has an upstream passage through which the working fluid flows toward the housing, and a downstream passage into which the working fluid flows out of the housing. The inlet passage is provided inside the tubular end portion, and the upstream passage communicates with the valve chamber through the inlet passage. The valve body has a tubular shape, is provided in the valve chamber and is movable in an axial direction along which a center line of the valve body extends. The valve body includes a first seat surface which is one end face for closing the inlet passage, and a second seat surface which is another end face for closing a valve port communicating with the valve chamber. The valve body is movable between a first position at which the first seat surface closes the inlet passage to block a flow of the working fluid into the valve chamber from the upstream passage and a second position at which the second seat surface closes the valve port to block the flow of the working fluid into the drain passage from the valve chamber. The support member includes a fixed portion fixed to an inner side of the tubular end portion and having the inlet passage extending through the fixed portion, and a support portion extending downstream from the fixed portion and supporting the valve body to be slidable in the axial direction. An inner peripheral surface of the valve body has a sliding surface that slides on an outer peripheral surface of the support portion. An outer peripheral surface of the valve body has a connection surface which connects the first seat surface and the second seat surface. The valve body, which is a resin molded product, includes a skin layer providing the outer peripheral surface of the valve body and a core layer under the skin layer. The valve body includes a core exposed portion where the core layer is exposed without being covered with the skin layer and forms a part of the outer peripheral surface of the valve body. The core exposed portion is provided on the connection surface without being provided on the first seat surface, the second seat surface, and the sliding surface.

According to a second aspect of the present disclosure, in a method for manufacturing a control valve that controls a flow of a working fluid, a mold device including a cavity and a gate connected to the cavity is prepared. A molded body is molded by supplying molten resin from the gate to the cavity in the mold device. The molded body includes a tubular or columnar valve body having a first seat surface which is one end face of the valve body, a second seat surface which is another end face of the valve body, a connection surface connecting the first and second seat surfaces on an outer surface, and a sliding surface on an inner peripheral surface. The molded body includes a gate portion where the molten resin remaining in the gate has solidified, the gate portion being connected to the connection surface without being connected to the first seat surface, the second seat surface and the sliding surface. The gate portion is cut off from the molded body to obtain the valve body with a gate trace remaining on the connection surface due to the cutting of the gate portion. A support member having a support portion and an inlet passage is prepared. A housing having a valve chamber and a drain passage communicating with the valve chamber is prepared. The support member is attached to the housing such that the inlet passage communicates with the valve chamber and that the sliding surface is slidable in an axial direction of the valve body on an outer peripheral surface of the support portion in the valve chamber in a state where the support portion is inserted into an interior of the valve body. A drive unit that moves the valve body in the axial direction is prepared. The drive unit is attached to the housing such that the valve body is movable between a first position at which the first seat surface closes the inlet passage and a second position at which the second seat surface closes the drain passage.

According to a third aspect of the present disclosure, a control valve controls a flow of a working fluid. The control valve includes a housing, a support member and a valve body. The housing includes a tubular end portion, a valve chamber inside the tubular end portion, an outflow port through which the working fluid flows out of the valve chamber, and a drain passage through which the working fluid is discharged from the valve chamber. The support member includes a fixed portion fixed to an inner side of the tubular end portion and having an inlet passage that extends through the fixed portion and allows the working fluid to flow therethrough into the valve chamber, and a support portion protruding from the fixed portion into the valve chamber. The valve body is provided in the valve chamber and has a tubular shape into which the support portion is inserted. The valve body includes a first seat surface on one end face of the valve body, and a second seat surface on another end face of the valve body. An inner surface of the valve body is slidable on the support portion in an axial direction of the valve body between a first position at which the first seat surface contacts the support portion to close the inlet passage and a second position at which the second seat surface contacts the housing to close the drain passage. The valve body, which is a resin molded product, includes a skin layer forming an outer surface of the valve body, and a core layer under the skin layer. The outer surface of the valve body includes a core exposed portion where the core layer is exposed without being covered with the skin layer.

DETAILED DESCRIPTION

Figure 1:
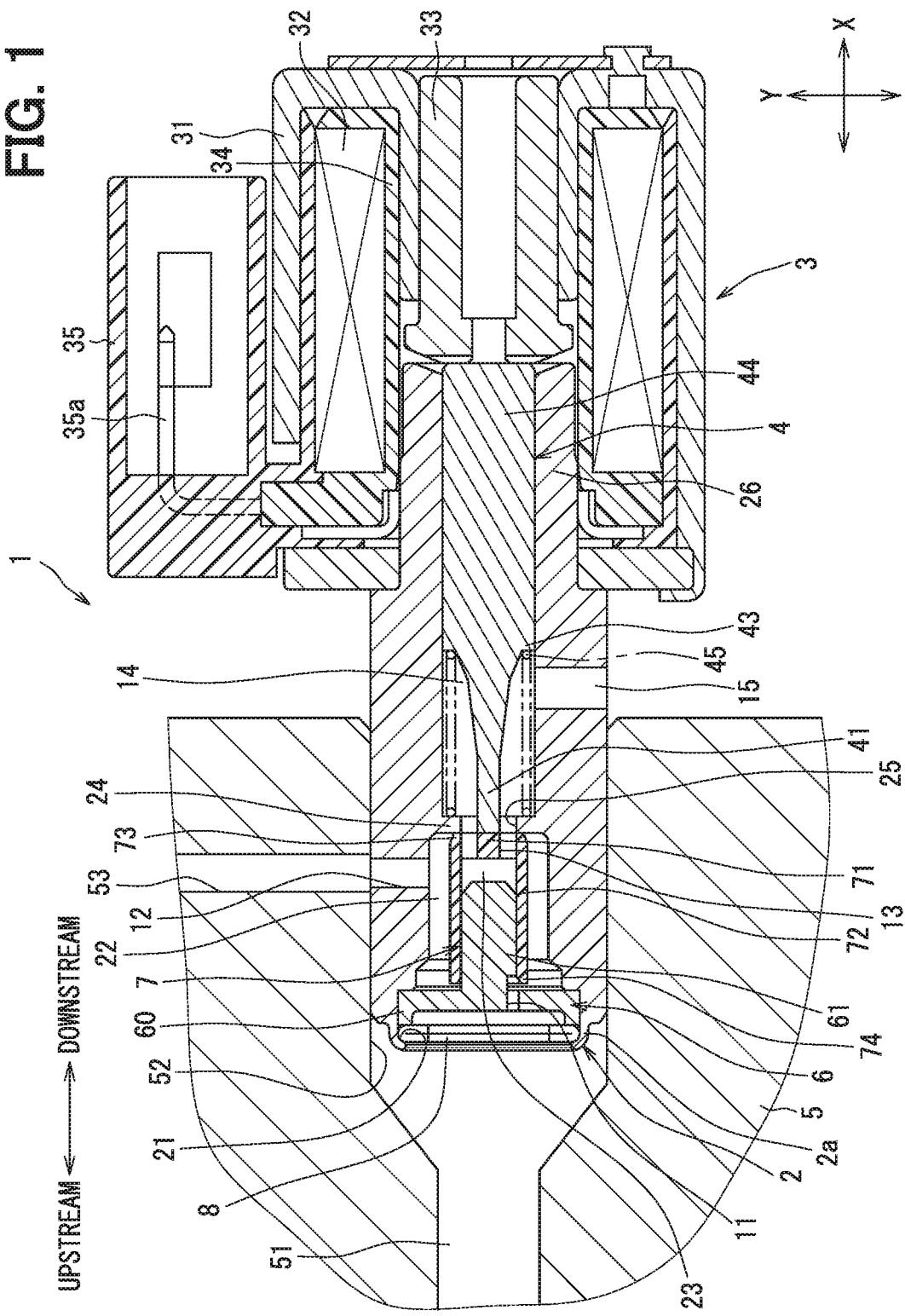
FIG. 1 is a cross-sectional view of an electromagnetic valve according to at least on embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
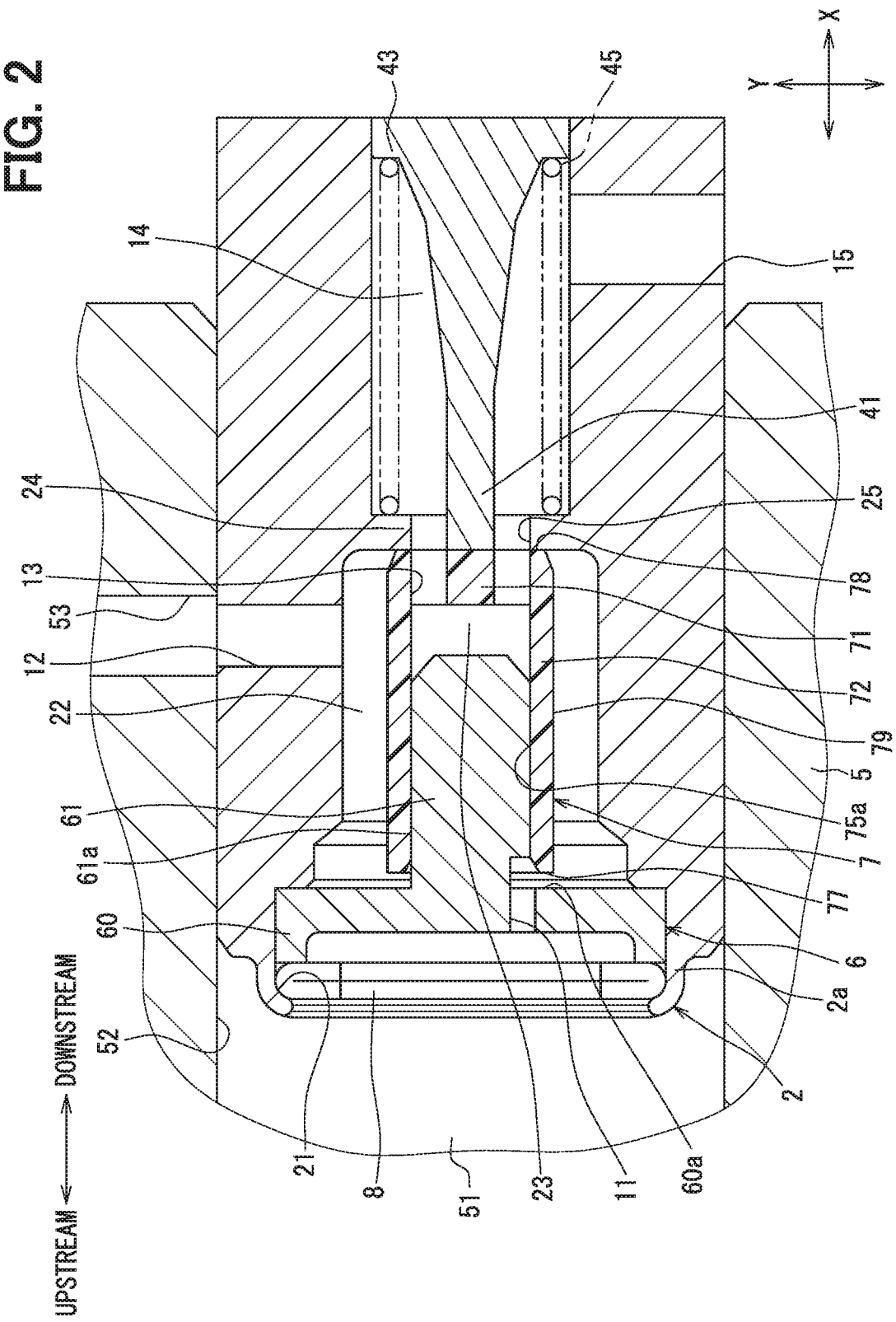
FIG. 2 is an enlarged view of a periphery of a valve body in FIG. 1.

An electromagnetic valve 1 according to a first embodiment will be described with reference to FIGS. 1 to 5. FIG. 1 shows a schematic configuration of an entire electromagnetic valve 1 which is mounted in, for example, an automatic transmission system of an automobile and switches an oil path for transmission control. The electromagnetic valve 1 shown in FIGS. 1 and 2 is configured to include a flow channel control unit that is housed in a housing 2, and an electromagnetic solenoid unit 3 that is integrally connected to the flow passage control unit. The electromagnetic valve 1 corresponds to a control valve, and the electromagnetic valve 1 may be referred to as a valve device.

The flow channel control unit includes a tubular housing 2 having a tubular end portion 2a fitted into a mounting hole 52. The mounting hole 52 provides a columnar passage inside the automatic transmission device or a passage formation member 5 on the automatic transmission device side. The tubular housing 2 extends in an axial direction of the mounting hole 52. An upstream passage 51, which is an oil inflow passage through which a pressure-regulated oil flows, is provided in the passage formation member 5 as an example of a working fluid, and the upstream passage 51 communicates with an inlet passage 11. The inlet passage 11 is a passage for communicating the upstream passage 51 with a valve chamber 22.

The housing 2 has a shaft holding portion 26 located on the side axially opposite to a tubular end portion 2a that is fitted into the mounting hole 52. The shaft holding portion 26 holds a shaft 4 so as to be displaceable in the axial direction, and is assembled to the externally fitted electromagnetic solenoid unit 3. As shown in FIG. 1, the electromagnetic valve 1 is attached to the automatic transmission device by fitting the tubular end portion 2a of the housing 2 into the mounting holes 52 of the passage formation member 5 and fixing an outflow port 12 and a downstream passage 53 to each other in a connected condition.

Inside the housing 2, a filter chamber 21 is provided at a position close to a tip. The filter chamber 21 is a chamber in which an oil from the automatic transmission side first flows into the electromagnetic valve 1, and a filter member 8 for filtering the oil, which is a working fluid, is mounted in the filter chamber 21 so as to cover an entire cross section of the passage.

The filter member 8 is a disc like member located at the most upstream of the oil flow inside the tubular end portion 2a. The filter member 8 has a net portion which is disposed at a position facing an upstream side in the inlet passage 11. The filter member 8 has a frame portion provided over an entire circumference so as to surround a periphery of a net portion. The net portion is formed, for example, by etching a central portion of a disc like plate material. The remaining portion of the plate material that has not been etched configures a frame portion formed around the net portion. The filter member 8 can also be manufactured by bonding, welding, or the like a net portion and a frame portion, which are separate members.

A support member 6 is accommodated inside a tubular end portion 2a. The support member 6 is a cylindrical member integrally formed with a mounting portion 60, which is a fixed portion fixed inside the tubular end portion 2a, and a rod-shaped shaft portion 61 extending from the central portion of the mounting portion 60 to the downstream side coaxially with the mounting portion 60. The mounting portion 60 is provided with an inlet passage 11 which is a passage penetrating in the axial direction. The shaft portion 61 supports the valve body 7 so as to be slidable in the axial direction X, and corresponds to a support portion. In the present embodiment, a direction in which a center line CL (refer to FIG. 3) of the valve body 7 extends is referred to as an axial direction X, and a direction perpendicular to the axial direction X is referred to as a radial direction Y. The axial direction X coincides with the axial direction of the mounting hole 52.

The mounting portion 60 is a flange-like portion that protrudes radially outward at an upstream end portion of the shaft portion 61, that is, at a root of the shaft portion 61. The mounting portion 60 is fixed to the tubular end portion 2a in such a manner that a peripheral edge of the mounting portion 60 is inscribed in the tubular end portion 2a and an inner wall of the tubular end portion 2a is partially crimped. Therefore, multiple crimping portions for fixing the mounting portion 60 to the housing 2 are provided on the inner wall of the tubular end portion 2a. One or more inlet passages 11 pass through the mounting portion 60 in the axial direction X closer to the center than the multiple crimping portions.

The mounting portion 60 is provided with a first valve seat 60a with which a first seat surface 77 of the valve body 7 can come into contact. The first valve seat 60a is a surface corresponding to a root peripheral edge of the shaft portion 61 in the mounting portion 60. The inlet passage 11, which is an upstream valve port, is provided inside the first valve seat 60a in the vicinity of the shaft portion 61. Therefore, in a state in which the first seat surface 77 is seated on the first valve seat 60a, an entire circumference of the end face of the first seat surface 77 comes in contact with the first valve seat 60a, so that the inlet passage 11 exists inside an annular contact portion between the first seat surface 77 and the first valve seat 60a, and the inlet passage 11 is closed. In the state where the first seat surface 77 is seated on the first valve seat 60a in that manner, the inlet passage 11 is closed to block a flow of the fluid from the upstream passage 51 to the valve chamber 22.

If the inlet passage 11 is provided at the mounting portion 60 inside the annular contact portion to which the first seat surface 77 is seated, the number and the opening shape of the inlet passage 11 are not limited. As a passage cross-sectional shape of the inlet passage 11, a rectangular shape, a circular shape, an arc shape, or a slit shape can be adopted.

The housing 2 is provided with the valve chamber 22 that communicates with the inlet passage 11 on the downstream side, and a downstream valve port 25 is opened at the downstream end portion of the valve chamber 22. The housing 2 is provided with an internal discharge passage 14 which communicates with the external discharge passage 15 on the downstream side of the downstream valve port 25. Accordingly, the downstream valve port 25 is a passage that communicates with the valve chamber 22 and the internal discharge passage 14. Further, the housing 2 is provided with the outflow port 12 which communicates with the valve chamber 22 and extends laterally of the valve chamber 22 so as to intersect with the axial direction X. The outflow port 12 is connected to a downstream passage 53 as an oil outflow passage provided in the passage formation member 5 and communicating with a valve of the transmission.

The housing 2 is provided with a second valve seat 24 with which a second seat surface 78 of the valve body 7 can come into contact. The second valve seat 24 corresponds to a peripheral portion of the downstream valve port 25 as a through hole that penetrates through a central portion of the valve chamber 22 in the axial direction X. When the second seat surface 78 of the valve body 7 is seated on the second valve seat 24, the downstream valve port 25 is closed to block a flow of the fluid from the valve chamber 22 to the internal discharge passage 14. The valve chamber 22 has a space located between the inlet passage 11 and the downstream valve port 25, and accommodates the valve body 7 and the shaft portion 61 of the support member 6.

The filter member 8 is integrally fixed to the mounting portion 60 of the support member 6 by, for example, a crimping portion provided at the tip portion of the tubular end portion 2a. Multiple crimping portions are arranged in a circumferential direction around the net portion. The crimping portion is obtained by deforming a protrusion portion protruding from an end face of the mounting portion 60 coming in contact with the frame portion by crimping. In other words, the filter member 8 and the mounting portion 60 are integrally integrated with each other in a state where the protrusion portion passing through a hole provided in the frame portion, and are disposed inside the tubular end portion 2a.

A position of the valve body 7 in the axial direction X is controlled by the operation of the electromagnetic valve 1 between a first position at which the inlet passage 11 is closed and the downstream valve port 25 is opened, and a second position at which the downstream valve port 25 is closed and the inlet passage 11 is opened. When the valve body 7 is at the first position, the first seat surface 77 is seated on the first valve seat 60a, while the second seat surface 78 is separated from the second valve seat 24. In that case, the valve body 7 prevents the working fluid from flowing from the upstream passage 51 to the valve chamber 22 through the inlet passage 11, while permitting the working fluid from flowing from the downstream passage 53 to the external discharge passage 15 through the valve chamber 22 and the downstream valve port 25.

When the valve body 7 is at the second position, the first seat surface 77 is separated from the first valve seat 60a, while the second seat surface 78 is seated on the second valve seat 24. In that case, the valve body 7 allows the working fluid to flow from the upstream passage 51 to the downstream passage 53 through the valve chamber 22 and the inlet passage 11, while preventing the working fluid from flowing from the valve chamber 22 to the external discharge passage 15 through the downstream valve port 25. In the case of shifting from one of the first position and the second position to the other, the valve body 7 passes through a third position in which both of the inlet passage 11 and the downstream valve port 25 are opened.

The valve body 7 has a tubular wall portion 72 having a tubular shape and a bottom portion 71 provided at one end of the tubular wall portion 72, and is a tubular body as a whole. In the valve body 7, an end located on the opposite side to the bottom portion 71 is opened, an upstream end face which is an end face on the open side is the first seat surface 77, and a downstream end face which is an end face on the side on which the bottom portion 71 is provided is the second seat surface 78.

The bottom portion 71 is provided with a pressure release passage 13 which passes through a portion other than the central portion which is in contact with the shaft 4. The pressure release passage 13 configures a passage for communicating the internal chamber 23 provided between the shaft portion 61 and the bottom portion 71 inside the valve body 7 with the downstream valve port 25 when the valve body 7 is in the second position.

The shaft portion 61 is coaxially inscribed in the tubular wall portion 72 of the valve body 7. The valve body 7 is slidable in the axial direction X with respect to the shaft portion 61 while an inner wall surface of the tubular wall portion 72 and an outer wall surface 61a of the shaft portion 61 are in contact with each other. In the shaft portion 61, the outer wall surface 61a corresponds to an outer peripheral surface.

When the valve body 7 is in the second position, a pressure in the valve chamber 22 is increased by an inflow of the working fluid from the upstream passage 51 into the valve chamber 22. In that case, since the fluid pressure of the valve chamber 22 acts on the valve body 7, the fluid pressure also acts on the internal chamber 23 of the valve body 7. The pressure acting on the valve chamber 22 acts on the first seat surface 77 which is the upstream end face of the valve body 7 in the valve chamber 22, and further acts on the internal chamber 23 through the sliding portion between the tubular wall portion 72 and the shaft portion 61. Therefore, the support member 6 guides a reciprocating movement in the axial direction X of the valve body 7 which receives the action force from the shaft 4 and the fluid pressure. Since the valve body 7 has the pressure release passage 13 penetrating through the bottom portion 71, the pressure acting on the internal chamber 23 is released to the internal discharge passage 14 through the pressure release passage 13, and the internal pressure in the internal chamber 23 can be reduced. As a result, even if a high fluid pressure acts on the valve chamber 22, the pressure applied to the valve body 7 in the axial direction X can be reduced.

An oil having a pressure higher than that of a fuel vapor flows through the electromagnetic valve 1 as a working fluid. In a state where at least the tubular end portion 2a of the housing 2 is fitted into the mounting hole 52, the outer surface of the housing 2 and the inner surface of the mounting hole 52 are in contact with each other. As a result, the sealing property is ensured, and a fluid leakage from a space between the outer surface of the housing 2 and the inner surface of the mounting hole 52 is reduced.

The valve body 7 is displaced in the axial direction X by a pressing force of the shaft 4 which is operated in the axial direction X by the electromagnetic solenoid unit 3, and is switched between the first position and the second position. At the first position, a tip portion 41 of the shaft 4 presses the bottom portion 71 to open the downstream valve port 25. At the second position, the tip portion 41 of the shaft 4 does not press the bottom portion 71, and the valve body 7 is pushed to the upstream side by the fluid pressure in the upstream passage 51, so that the inlet passage 11 is opened.

The electromagnetic solenoid unit 3 disposed on a rear end of the housing 2 includes a yoke 31, a bobbin 34, a coil 32, a mover 33, a shaft 4, a spring 45, a connector 35, and the like. The electromagnetic solenoid unit 3 is a drive unit that moves the valve body 7 in the axial direction X by driving. The bobbin 34 is made of a resin material and formed into a substantially circular tubular shape, and is provided inside the yoke 31. The coil 32 is wound around an outer peripheral surface of the bobbin 34. The yoke 31 is made of a magnetic material. The yoke 31 is provided coaxially with the bobbin 34 so as to support an inner peripheral side of the bobbin 34 and cover an outer peripheral side of the coil 32. The bobbin 34 is provided coaxially with the housing 2 in a state in which a portion of the housing 2 which slidably supports the shaft 4 is accommodated inside. Like the bobbin 34, the yoke 31, the mover 33, the shaft 4, and the like are provided coaxially with the housing 2.

The mover 33 is made of a magnetic material and formed in a circular tubular shape. The mover 33 is supported by the yoke 31 so as to be capable of reciprocating in the axial direction X. In the electromagnetic solenoid unit 3, a magnetic circuit is formed by the mover 33 and the yoke 31.

A large diameter portion 44 of the shaft 4 is fixed to an end face of the mover 33 on the bottom side coaxially with the mover 33. The shaft 4 and the mover 33 are integrally reciprocally movable in the axis center direction. The shaft 4 is integrally provided with a small diameter tip portion 41 concentrically positioned on the downstream valve port 25, and the large diameter portion 44 slidably fitted in the shaft holding portion 26 through a step portion 43. The internal discharge passage 14 is connected to an external discharge passage 15 provided on the rear end side of the housing 2. The external discharge passage 15 is a drain passage provided in the housing 2 on the tip side of the shaft holding portion 26 so as to extend in a direction perpendicular to the internal discharge passage 14.

The spring 45, which is an example of an urging member, is interposed between the step portion 43 and the peripheral edge of the downstream valve port 25. The spring 45 constantly applies an urging force for pushing the shaft 4 toward the mover 33. As a result, when the electromagnetic solenoid unit 3 is not energized, the shaft 4 is urged by a spring force of the spring 45, whereby the tip portion 41 of the shaft 4 is separated from the bottom portion 71, so that the valve body 7 opens the inlet passage 11 by the fluid pressure, and the valve body 7 closes the downstream valve port 25. In other words, the valve body 7 shifts to the second position. In that state, a communication between the upstream passage 51 and the downstream passage 53 is permitted, and the oil from the upstream passage 51 flows to the downstream passage 53 through the inlet passage 11, the valve chamber 22, and the outflow port 12.

The connector 35 is molded with an outer skin of the coil 32, and is provided so as to be positioned on a side of the yoke 31. The connector 35 is provided to energize the coil 32, and the internal terminal 35a is electrically connected to the coil 32. The electromagnetic solenoid unit 3 can control a current that energizes the coil 32 by electrically connecting the terminal 35a to a current control device or the like through the connector 35.

When the coil 32 of the electromagnetic solenoid unit 3 is energized, a magnetic flux is generated in the magnetic circuit formed by the yoke 31 and the mover 33, and the mover 33 is attracted in the axial direction X toward the tip side of the housing 2, and moves toward the tip side against the urging force of the spring 45 to move the shaft 4. At that time, since the valve body 7 is pushed to the upstream side by the shaft 4, the downstream valve port 25 is opened to close the inlet passage 11. In other words, the valve body 7 shifts to the first position. In that state, the communication between the upstream passage 51 and the downstream passage 53 is blocked, the communication between the downstream passage 53 and the external discharge passage 15 is permitted, and the oil from the downstream passage 53 flows to the external discharge passage 15 through the outflow port 12, the valve chamber 22, the downstream valve port 25, and the internal discharge passage 14. In that manner, a control fluid pressure of the oil outflow passage can be controlled in on/off by turning on/off the current flowing through the coil 32. This makes it possible to control a pressure, a flow rate, and the like of the control fluid used for controlling a control target.

In the electromagnetic valve 1, when a high supply pressure of the working fluid acts on the valve chamber 22 through the inlet passage 11, the pressure is separated between the inside and the outside of the valve body 7 through a sliding portion with the support member 6, and the pressure in the valve chamber 22 can be kept high.

At that time, at the first position in which the working fluid flows from the upstream passage 51 to the downstream passage 53 through the inlet passage 11, the internal chamber 23 of the valve body 7 and the external discharge passage 15 communicate with each other through the pressure release passage 13 passing through the bottom portion 71 of the valve body 7. As a result, the pressure in the internal chamber 23 can be released to the external discharge passage 15 through the pressure release passage 13. Therefore, when the supply pressure of the working fluid acts on the valve chamber 22 through the inlet passage 11, the pressure in the internal chamber 23 also increases. However, since the pressure can be released to the downstream side through the pressure release passage 13, the pressure pressing the bottom portion 71 of the valve body 7 to the downstream side is reduced. Since the force for pushing the valve body 7 to the downstream side can be reduced in this manner, the force for driving the shaft 4 to the upstream side can be reduced by the electromagnetic solenoid unit 3. Since the valve body driving force by the electromagnetic solenoid unit 3 can be reduced, a flow rate characteristic can be secured without increasing the size of the electromagnetic valve 1. As described above, according to the electromagnetic valve 1, the deterioration of the flow rate characteristic can be reduced, and a required valve body driving force can be reduced to reduce a size of the device. Further, according to the electromagnetic valve 1, not only an increase in the size of the device can be avoided, but also a current value necessary for driving the valve body 7 can be reduced, so that the energy consumption can be reduced.

Figure 3:
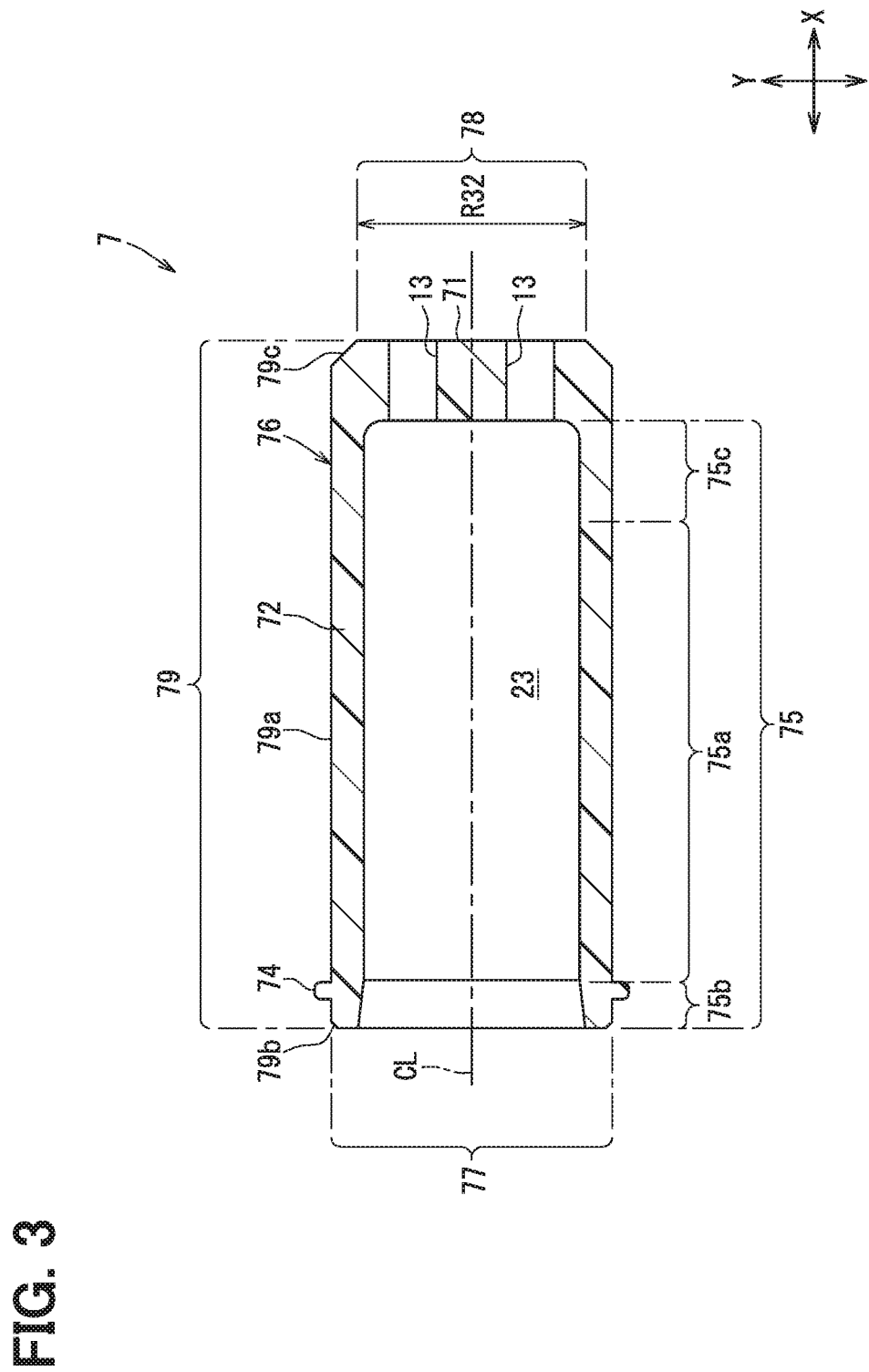
FIG. 3 is a vertical cross-sectional view of the valve body in an axial direction.
Figure 5:
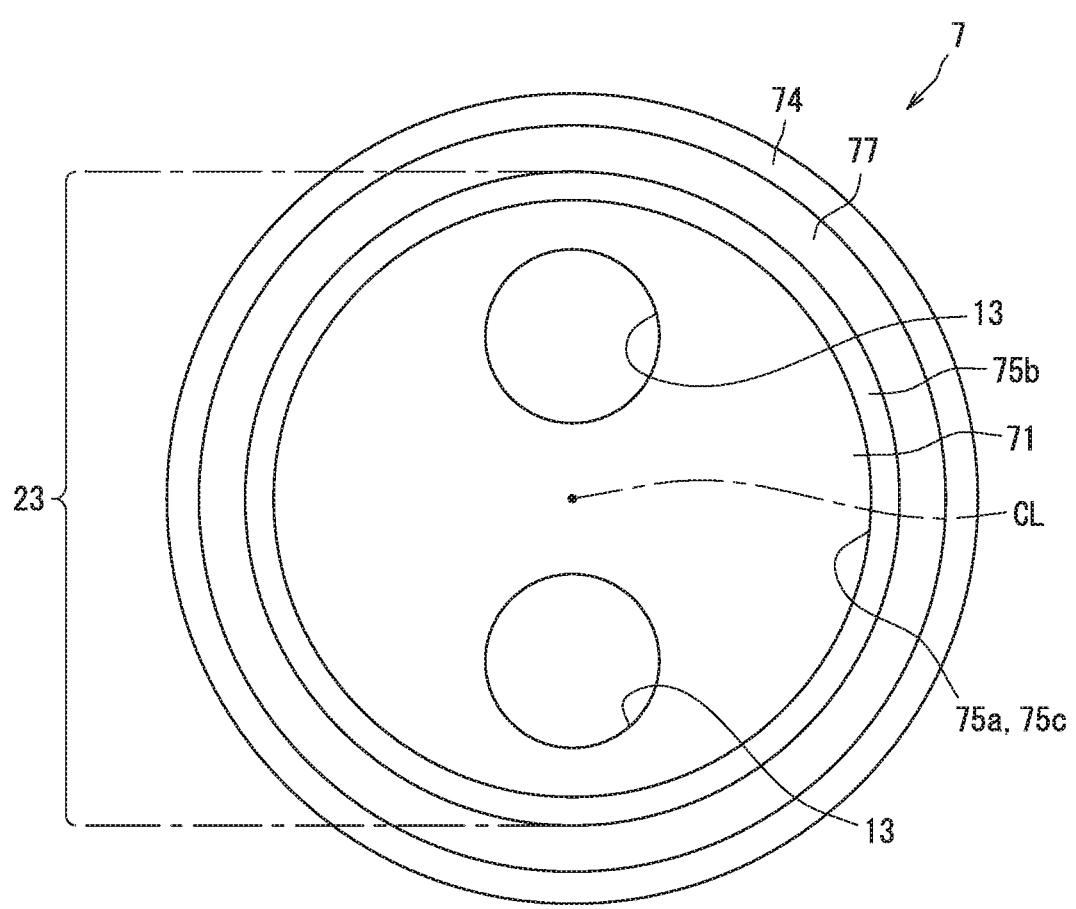
FIG. 5 is a view of the valve body when viewed from a first seat surface side.

As shown in FIG. 3, the valve body 7 has an inner peripheral surface 75 and an outer surface 76. The inner peripheral surface 75 is formed by an inner wall surface of the tubular wall portion 72. The inner peripheral surface 75 has a sliding surface 75a that slides on the outer wall surface 61a of the shaft portion 61, an extension surface 75b that extends the opening of the valve body 7 radially outward, and a bottom side surface 75c that extends from the sliding surface 75a toward the bottom portion 71. The extension surface 75b is spaced radially outwardly from the outer wall surface 61a of the shaft portion 61 and does not slide against the outer wall surface 61a. The bottom side surface 75c is a portion of the inner peripheral surface 75 which does not slide on the outer wall surface 61a of the shaft portion 61 even when the valve body 7 is in each of the first position and the second position. As shown in FIG. 5, the sliding surface 75a, the extension surface 75b, and the bottom side surface 75c all extend annularly in the circumferential direction of the valve body 7 around the center line CL. A circumferential direction of the valve body 7 is a direction orthogonal to both the axial direction X and the radial direction Y.

Figure 4:
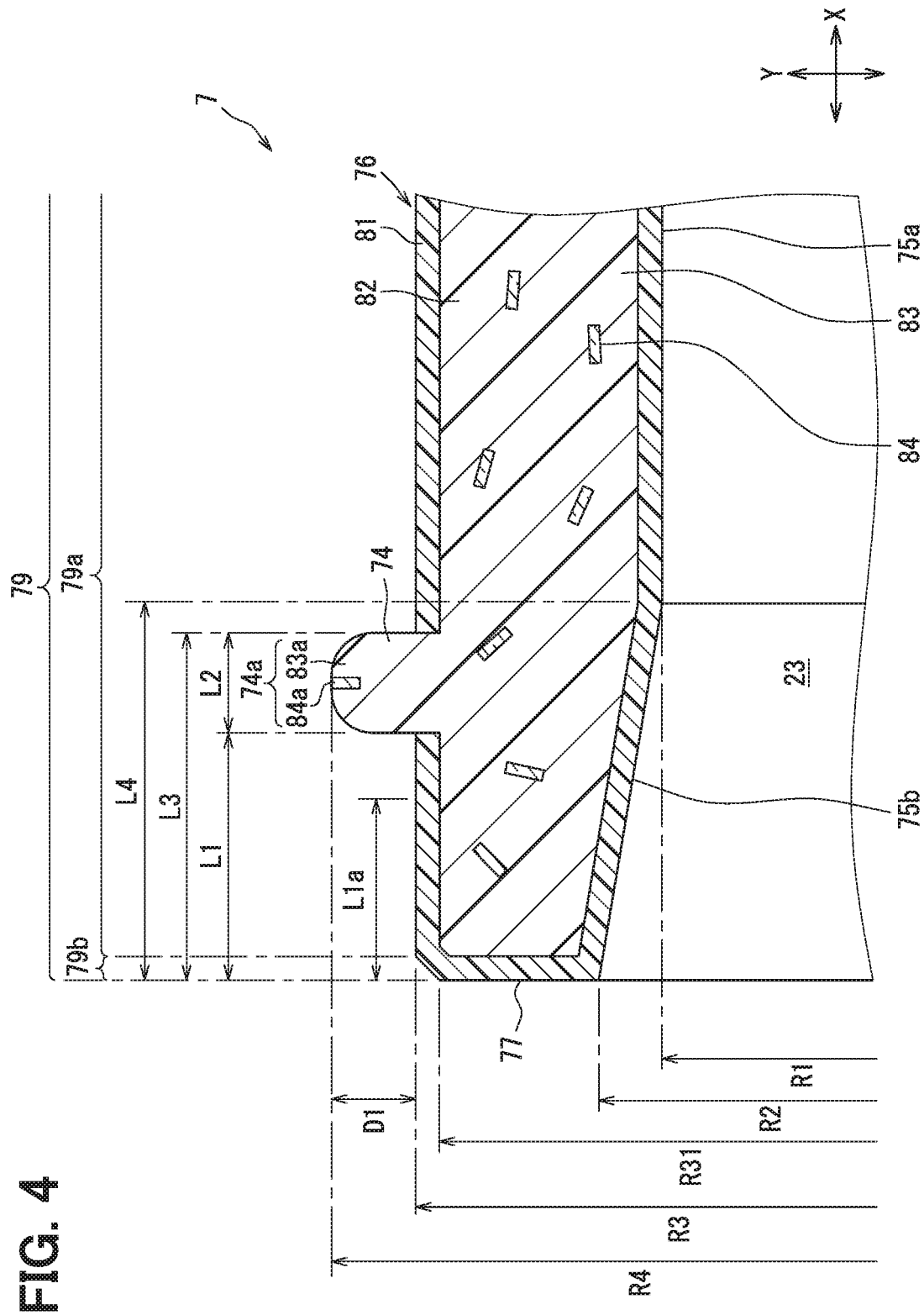
FIG. 4 is an enlarged view of the periphery of a gate remaining portion of a gate in FIG. 3.

As shown in FIGS. 3 and 4, the extension surface 75b is an inclined surface extending straight in a direction inclined with respect to the radial direction Y. An inner diameter of the extension surface 75b gradually increases from the sliding surface 75a toward the first seat surface 77. An inner diameter R2 of the upstream end portion of the extension surface 75b is larger than an inner diameter R1 of the sliding surface 75a. The inner diameter R2 is an inner diameter of the first seat surface 77. The extension surface 75b can exert a function of guiding the shaft portion 61 into the valve body 7 when the shaft portion 61 is inserted into the valve body 7 at the time of manufacturing the electromagnetic valve 1. The inner peripheral surface 75 is included in the inner surface of the valve body 7, and the inner surface also includes a bottom surface formed by the bottom portion 71. The bottom side surface 75c extends over the bottom surface and the sliding surface 75a.

The outer surface 76 has a pair of end faces, that is, the seat surfaces 77 and 78, and an outer peripheral surface 79. The outer peripheral surface 79 is formed by an outer wall surface of the tubular wall portion 72, connects the first seat surface 77 to the second seat surface 78, and corresponds to a connection surface. In an outer contour of the valve body 7, the upstream corner portion and the downstream corner portion are each chamfered. The outer peripheral surface 79 has a base surface 79a extending straight in the axial direction X, an upstream chamfered surface 79b, and a downstream chamfered surface 79c. The upstream chamfered surface 79b is chamfered at an outgoing corner between the base surface 79a and the first seat surface 77, and the downstream chamfered surface 79c is chamfered at an outgoing corner between the base surface 79a and the second seat surface 78. All of the base surface 79a and the chamfered surfaces 79b and 79c extend in an annular shape in the radial direction. The chamfered surfaces 79b and 79c are inclined surfaces extending straight in a direction inclined with respect to the radial direction Y. In FIG. 5, the upstream chamfered surface 79b is not shown.

As shown in FIG. 4, in the outer peripheral surface 79, an outer diameter of the upstream chamfered surface 79b gradually decreases toward the second seat surface 78 in the axial direction X. An outer diameter R31 of the upstream end portion of the upstream chamfered surface 79b is smaller than an outer diameter R3 of the base surface 79a. The outer diameter R31 is an outer diameter of the first seat surface 77. As shown in FIG. 3, an outer diameter of the downstream chamfered surface 79c gradually decreases toward the first seat surface 77 in the axial direction X. An outer diameter R32 of the downstream end portion of the downstream chamfered surface 79c is smaller than the outer diameter R3 of the base surface 79a. The outer diameter R32 is an outer diameter of the second seat surface 78. The outer diameter of the second seat surface 78 is smaller than the outer diameter of the first seat surface 77.

Since the chamfered surfaces 79b and 79c are provided on the valve body 7, the upstream corner portion and the downstream corner portion of the valve body 7 are less likely to be unintentionally chipped or deformed when the valve body 7 is molded with resin. In the above configuration, when the valve body 7 is at the second position, the working fluid that has entered between the downstream chamfered surface 79c and the second valve seat 24 pushes the downstream chamfered surface 79c in the direction in which the second seat surface 78 is separated from the second valve seat 24. In that case, a force required to separate the valve body 7 from the second valve seat 24 can be reduced by driving the electromagnetic solenoid unit 3.

As shown in FIG. 4, the valve body 7, which is a resin molded product, has a skin layer 81 forming the surface of the valve body 7, and a core layer 82 provided inside the skin layer 81. The skin layer 81 forms the inner peripheral surface 75, the seat surfaces 77 and 78, and the outer peripheral surface 79. The valve body 7 has a resin portion 83 made of a resin material, and glass fibers 84 which are fillers mixed in the resin portion 83. In both the skin layer 81 and the core layer 82, the glass fibers 84 are mixed in the resin portion 83. A filler of a type different from that of the glass fibers 84 may be mixed in the resin portion 83.

As shown in FIGS. 3 to 5, the valve body 7 has a gate remaining portion 74, which is a trace of cutting the gate portion 101 (refer to FIG. 7) at the time of manufacturing the valve body 7. The gate remaining portion 74 is a part of the gate portion 101 remaining on the valve body 7 as the gate portion 101 is cut, and is a projection portion formed by the outer peripheral surface 79 projecting toward the radially outer side. The gate remaining portion 74 extends toward the radially outer side from the base surface 79a and protrudes to the radially outer side than the base surface 79a and the seat surfaces 77 and 78.

In the gate remaining portion 74, the core layer 82 is exposed in the valve chamber 22, and a portion of the outer surface of the gate remaining portion 74 formed by the core layer 82 is referred to as a core exposed portion 74a. The gate remaining portion 74 and the core exposed portion 74a extend annularly along the base surface 79a in the circumferential direction of the valve body 7. The gate remaining portion 74 and the core exposed portion 74a are provided between the sliding surface 75a and the first seat surface 77 in the axial direction X, so that the gate remaining portion 74 and the core exposed portion 74a are aligned with the extension surface 75b in the radial direction Y. The skin layer 81 does not form or only partially forms the outer surface of the gate remaining portion 74, and the entire or a part of the outer surface of the gate remaining portion 74 is the core exposed portion 74a. In either case, the core exposed portion 74a is included in the outer peripheral surface 79. The whole of the seat surfaces 77 and 78, the whole of the sliding surface 75a, and most of the outer peripheral surface 79 are formed by the skin layer 81, and the core exposed portion 74a which is a part of the outer peripheral surface 79 is formed by the core layer 82. FIG. 4 shows a configuration in which the entire outer surface of the gate remaining portion 74 is the core exposed portion 74a.

The core exposed portion 74a is a cut surface of the skin layer 81 and the core layer 82, and is a cut surface of the valve body 7. The core exposed portion 74a includes a cut surface obtained by cutting the resin portion 83 and a cut surface obtained by cutting the glass fibers 84, and those cut surfaces are exposed in the core exposed portion 74a. A surface of the outer surface 76 of the valve body 7 formed by the skin layer 81 is a molding surface molded by a mold device 90, which will be described later. The surface may be neither a cut surface of the skin layer 81 or the core layer 82, nor a cut surface of the resin portion 83 or the glass fibers 84.

The gate remaining portion 74 is provided at a position separated from both of the first seat surface 77 and the sliding surface 75a in the axial direction X. As shown in FIG. 4, a separation distance L1 between the first seat surface and the gate remaining portion 74 in the axial direction X is equal to or larger than a predetermined distance L1a. The predetermined distance L1a is set to, for example, a value equal to or larger than a length dimension L2 of the gate remaining portion 74 in the axial direction X (for example, 0.2 mm). In the axial direction X, a separation distance L3 between the downstream end portion of the gate remaining portion 74 and the first seat surface 77 is smaller than a length dimension L4 of the extension surface 75b. In that case, the gate remaining portion 74 and the core exposed portion 74a are disposed at a position in which a separation distance from the first seat surface 77 in the axial direction X is smaller than the length dimension L4 of the extension surface 75b and is equal to or larger than the predetermined distance L1a. In the radial direction Y, a protrusion dimension D1 of the gate remaining portion 74 from the base surface 79a is, for example, 0.2 mm.

In the outer peripheral surface 79, a virtual region extending from the first seat surface 77 toward the second seat surface 78 by the predetermined distance L1a indicates a gate installation prohibition range in which the installation of the gate portion 101 is prohibited.

Next, a method of manufacturing the electromagnetic valve 1 will be described. The method of manufacturing the electromagnetic valve 1 includes a method of manufacturing the valve body 7 using a mold device 90 such as a mold. The method of manufacturing the electromagnetic valve 1 corresponds to a method of manufacturing the control valve.

Figure 6:
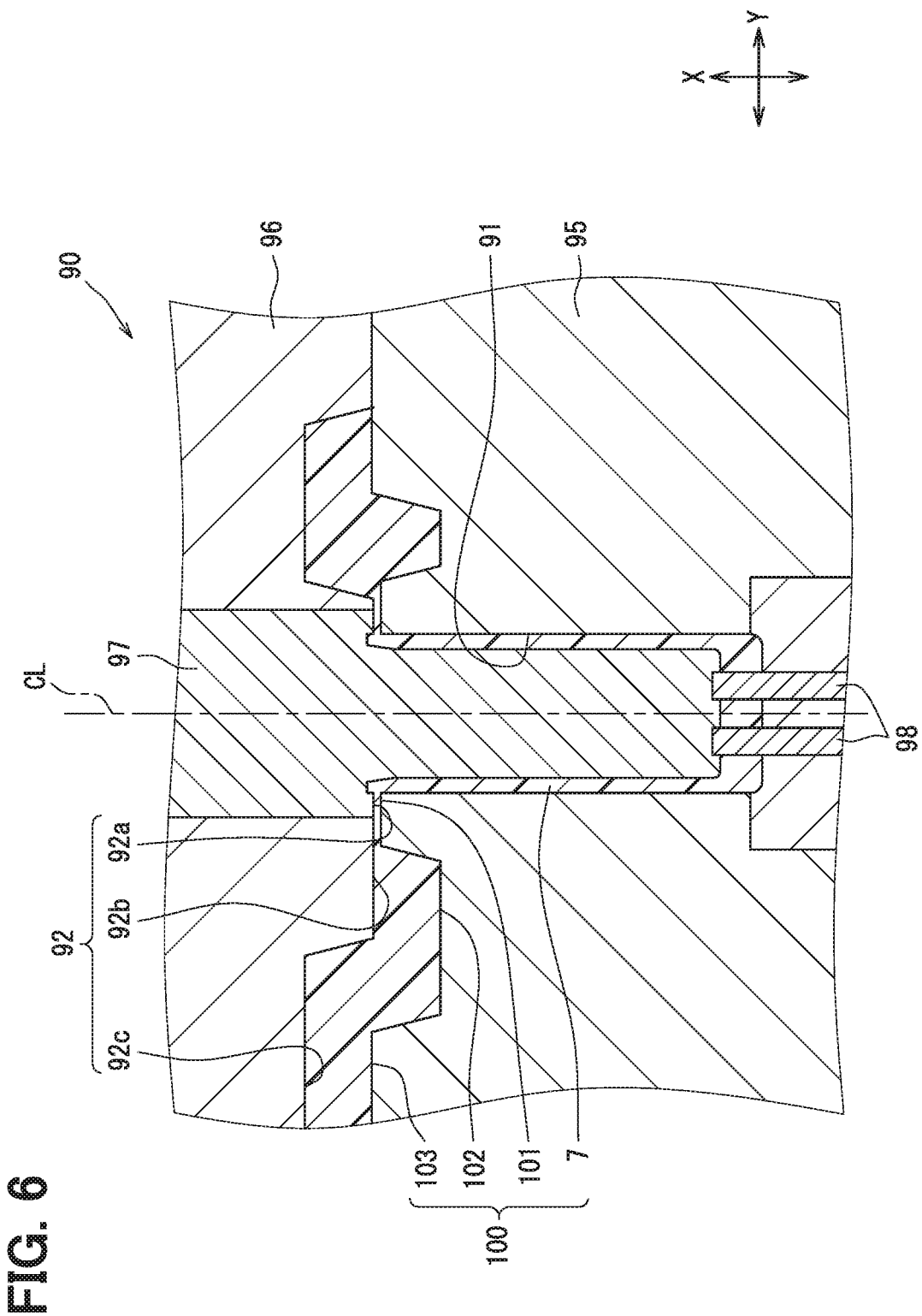
FIG. 6 is a vertical cross-sectional view showing a configuration of a mold device.

First, the mold device 90 for molding the valve body 7 with resin will be described. As shown in FIG. 6, a cavity 91 for molding the valve body 7 and a resin passage 92 for supplying a molten resin to the cavity 91 are provided inside the mold device 90. Since the cavity 91 has a circular tubular internal space, the tubular valve body 7 is molded by the cavity 91. In addition, only one connection portion where the resin passage 92 and the cavity 91 are connected to each other is provided.

The resin passage 92 includes a sprue (not shown) to which the molten resin is supplied from an injection molding machine, a gate 92a for supplying the molten resin to the cavity 91, and runners 92b and 92c for connecting the sprue and the gate 92a. The gate 92a is a film gate, and is provided on an outer peripheral side of the cavity 91, and extends annularly along a circumferential direction of the cavity 91. The gate 92a is disposed in the radial direction Y at a position aligned with a portion of the cavity 91 where the tubular end portion 2a is molded. The first runner 92b is provided on an outer peripheral side of the gate 92a, and extends in an annular shape along a circumferential direction of the gate 92a. The second runner 92c connects the first runner 92b with the sprue while extending in the radial direction Y.

The mold device 90 has mold portions 95 to 98. In the mold device 90, the mold portions 95 to 98 are combined with each other to form the cavity 91, the gate 92a, and the runners 92b and 92c. In the valve body 7, the first mold portion 95 molds at least the base surface 79a and the second seat surface 78, and the second mold portion 96 molds at least the sliding surface 75a and the first seat surface 77. The first pin mold portion 97 is inserted into an insertion hole provided in the first mold portion 95 to be assembled to the first mold portion 95, and molds an inner peripheral surface of the pressure release passage 13. The second pin mold portion 98 is inserted into an insertion hole provided in the second mold portion 96 to be assembled to the second mold portion 96, and molds an inner peripheral surface of the internal chamber 23.

In the case of manufacturing the valve body 7, after preparing the mold device 90, a step of molding a molded body 100 with the use of the mold device 90 is performed. In that step, first, a molten resin, which is a resin material in which the glass fibers 84 are mixed, is injected from an injection molding machine into the sprue of the mold device 90. The molten resin flows from the gate 92a into the cavity 91 through the runners 92b and 92c, proceeds in the radial direction Y to reach a portion of the cavity 91 where the bottom portion 71 is molded, and advances in the axial direction X to reach a portion of the cavity 91 where the tubular wall portion 72 is molded.

As described above, since the gate 92a has the annular shape, the molten resin flowing through the portion of the cavity 91 where the tubular wall portion 72 is molded does not easily advance in the circumferential direction of the cavity 91 and easily advances in the axial direction X. In other words, a flow of the molten resin in the portion of the cavity 91 where the sliding surface 75a is molded is hardly disturbed. For that reason, when the molten resin solidifies to form the tubular wall portion 72, a shrinkage anisotropy of the molten resin is reduced, so that the tubular wall portion 72 and the sliding surface 75a are less likely to be bent or deformed.

In addition, since the gate 92a has the annular shape, the molten resin flowing in the opposite direction in the circumferential direction of the cavity 91 is less likely to be merged with each other. For that reason, a weld, which is the merging portion of the molten resin, hardly occurs when the molten resin is solidified and the tubular wall portion 72 is molded. When the molten resin is injected into the mold device 90, the inside of the cavity 91 is degassed by the first pin mold portion 97 so that the gas escapes from a side opposite to the gate 92a in the axial direction X of the cavity 91.

In the mold device 90, the gate 92a and a portion of the cavity 91 where the expansion surface 75b is molded are aligned with each other in the radial direction Y, and a portion of the inner peripheral surface of the cavity 91 where the extension surface 75b is molded is inclined with respect to the axial direction X. In the above configuration, the molten resin that has flowed into the cavity 91 from the gate 92a is guided toward the second pin mold portion 98 by a portion of the inner peripheral surface of the cavity 91 in which the extension surface 75b is molded. In that case, since a disturbance is less likely to occur in the flow of the molten resin in a portion of the cavity 91 where the sliding surface 75a is molded, when the molten resin solidifies to form the sliding surface 75a, a shrinkage anisotropy of the molten resin is reduced, so that the sliding surface 75a does not easily bend or deform.

In the configuration in which the gate 92a and the portion of the cavity 91 where the expansion surface 75b is molded are aligned in the radial direction Y, there is a concern that the sliding surface 75a is less likely to be bent or deformed, while the extension surface 75b is likely to be bent or deformed due to the disturbance of the flow of the molten resin. However, even if the extension surface 75b is bent or deformed, the sliding property of the sliding surface 75a of the valve body 7 with respect to the outer wall surface 61a of the shaft portion 61 is hardly lowered by the bending or deformation. For that reason, the positional relationship between the cavity 91 and the gate 92a makes it possible to reduce the deterioration of the slidability of the valve body 7.

After the molten resin has been solidified, the mold device 90 is removed from the molded body 100 which is the solidified molten resin. In the molded body 100, a portion of the molten resin injected into the mold device 90, which comes in contact with the inner peripheral surfaces of the cavity 91, the gate 92a, and the runners 92b and 92c cools and solidifies, thereby forming the skin layer 81. After the skin layer 81 has been formed, the molten resin flowing inside the skin layer 81 solidifies at a timing later than that of the skin layer 81, thereby forming the core layer 82.

Figure 7:
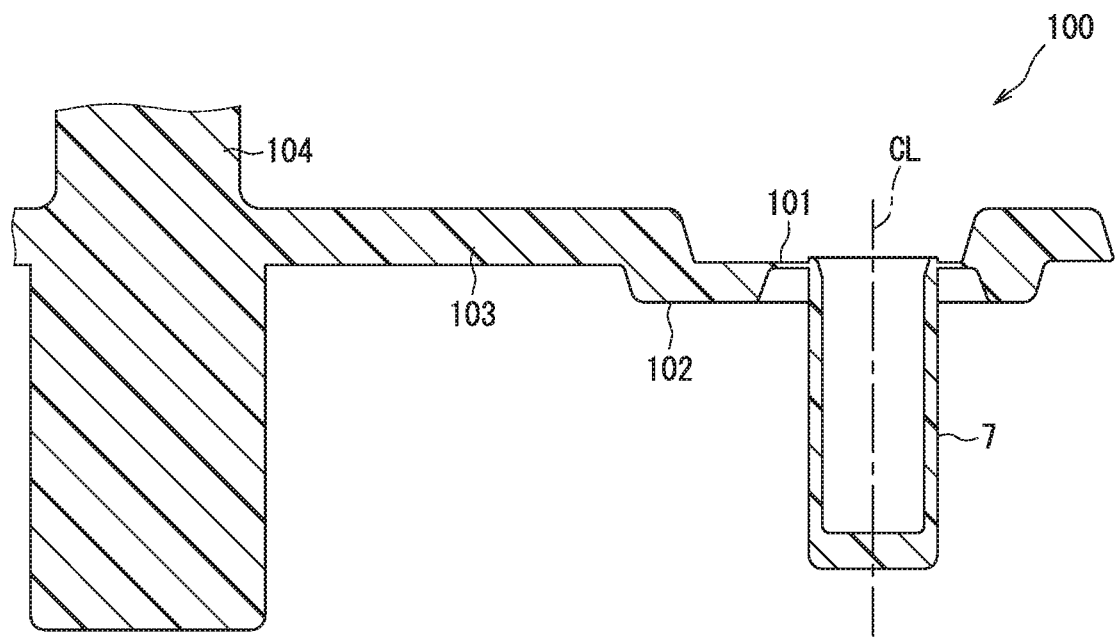
FIG. 7 is a vertical cross-sectional view showing a molded body.
Figure 8:
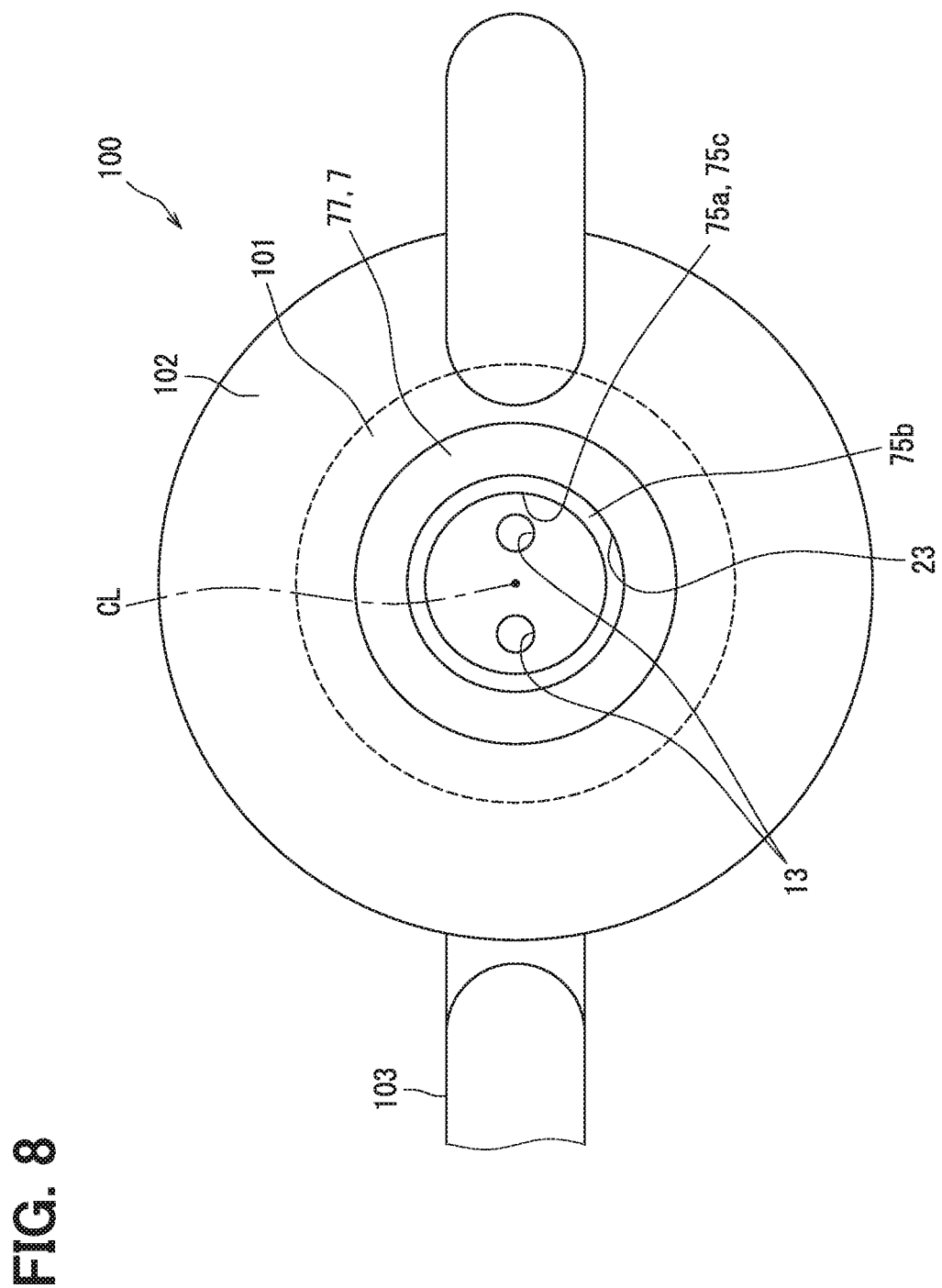
FIG. 8 is a view of a periphery of the valve body in the molded body when viewed from the first seat surface side.

As shown in FIG. 7, in the molded body 100, the valve body 7, the gate portion 101 molded by the gate 92a, the runner portions 102 and 103 molded by the runners 92b and 92c, and the sprue portion 104 molded by the sprue are integrated together. As shown in FIG. 8, the gate portion 101 extends to the radially outer side from the base surface 79a of the valve body 7, and annularly extends in the circumferential direction of the valve body 7. The first runner portion 102 extends toward the radially outer side from the gate portion 101, and annularly extends in the circumferential direction of the gate portion 101. In that case, the gate portion 101 is disposed between the valve body 7 and the first runner portion 102 in the radial direction Y of the valve body 7, and is disposed at a position separated from each of the first seat surface 77 and the sliding surface 75a in the axial direction X of the valve body 7. The second runner portion 103 connects the first runner portion 102 and the sprue portion 104.

Figure 9:
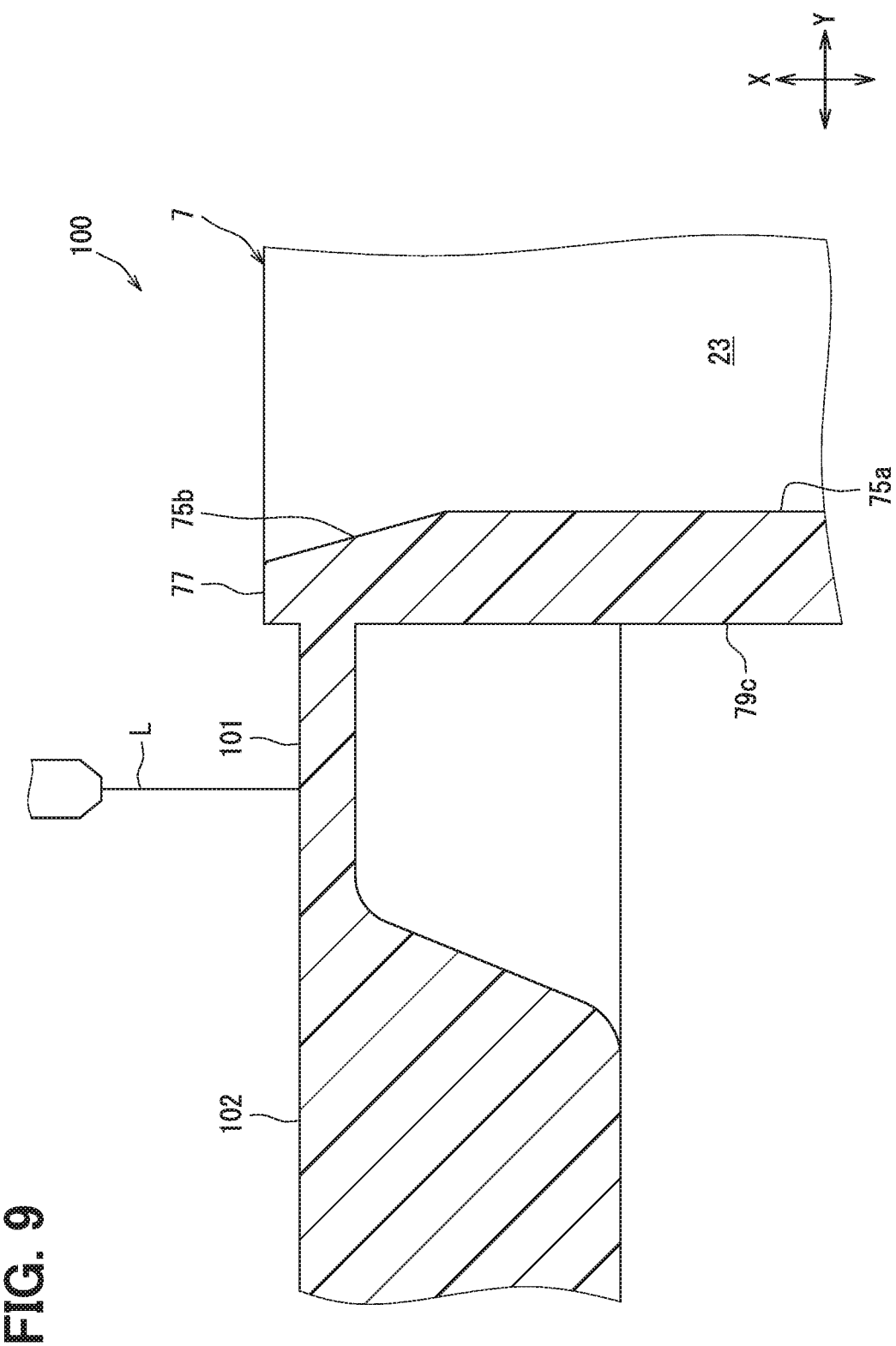
FIG. 9 is a diagram illustrating cutting of a gate portion by a laser.

Next, a step of removing the valve body 7 from the first runner portion 102 in the molded body 100 is performed. Since the valve body 7 is included in the molded body 100 having the skin layer 81 and the core layer 82, the valve body 7 also has the skin layer 81 and the core layer 82. In that step, as shown in FIG. 9, the gate portion 101 is cut by a laser L output from a laser irradiation device LD. In this example, the laser L is output from the laser irradiation device LD so that the laser L extends in the axial direction X of the valve body 7, and a position spaced radially outward from the tubular wall portion 72 of the valve body 7 and radially inward from the first runner portion 102 in the gate portion 101 is irradiated with the laser L. After the gate portion 101 has been cut off, a portion of the gate portion 101 remaining on the valve body 7 becomes the gate remaining portion 74.

When the gate portion 101 is cut by the laser L, it is assumed that a part of the gate portion 101 is melted by a heat of the laser L, and the melted resin spreads in the axial direction X. On the other hand, in the molded body 100, the gate portion 101 is separated from the first seat surface 77 by at least a predetermined distance L1a, similarly to the gate remaining portion 74 described above. For that reason, even if a part of the gate portion 101 melts and spreads in the axial direction X with the irradiation of the laser L, the melted resin is less likely to reach the first seat surface 77. In other words, the predetermined distance L1a indicating a lower limit value of the separation distance L1 of the gate remaining portion 74 from the first seat surface 77 is set to a value at which the melted portion of the gate portion 101 is less likely to reach the first seat surface 77. In addition, since a part of the gate portion 101 melts and expands in the axial direction X, the length dimension L4 of the gate remaining portion 74 in the axial direction X tends to be larger than a thickness dimension of the gate portion 101 in the axial direction X.

In the gate portion 101, both of the skin layer 81 and the core layer 82 are melted in accordance with the irradiation with the laser L, so that the skin layer 81 is easily disappeared in the gate remaining portion 74. In the gate remaining portion 74, both of the portion where the core layer 82 has been cut and the portion where the skin layer 81 has disappeared are collectively referred to as a core exposed portion 74a, and the core exposed portion 74a is a cut surface of the valve body 7 in the molded body 100. For that reason, as shown in FIG. 4, in the gate remaining portion 74, the core layer 82 is easily exposed not only to the radially outer side of the valve body 7 but also to the axial direction X. The core exposed portion 74a is a trace obtained by cutting the gate portion 101, and corresponds to a gate trace.

When the gate portion 101 is cut by the laser L, both the resin portion 83 and the glass fibers 84 are cut by the laser L, and the core exposed portion 74a includes a cut surface 83a of the resin portion 83 and a cut surface 84a of the glass fiber 84. The glass fibers 84 cut by the laser L may fall off from the resin portion 83 due to shortening or the like. In that case, a hole is provided in the core exposed portion 74a by the glass fiber 84 falling off.

Subsequently, an assembling step is performed in which multiple members such as the housing 2, the support member 6, the valve body 7, and the electromagnetic solenoid unit 3 are assembled to each other. The assembling step includes a step of installing the valve body 7 in the valve chamber 22 of the housing 2. In that step, the valve body 7 is assembled to the support member 6 by inserting the shaft portion 61 into the internal chamber 23 of the valve body 7. Then, the valve body 7 and the support member 6 are inserted into the valve chamber 22 through the opening on the tip side of the housing 2 so that the valve body 7 is installed in the valve chamber 22 so that the sliding surface 75a of the valve body 7 can slide on the outer wall surface 61a of the shaft portion 61. In this example, the mounting portion 60 of the support member 6 is fixed to the housing 2.

The assembling step includes a step of attaching the electromagnetic solenoid unit 3 to the housing 2 so as to move the valve body 7 in the axial direction X to shift to the first position and the second position. In that step, the tip portion 41 of the shaft 4 is inserted inside the shaft holding portion 26 so as to accommodate the spring 45 inside the shaft holding portion 26 of the housing 2, and the mover 33 is fixed to the large diameter portion 44 of the shaft 4. The yoke 31, the coil 32, the bobbin 34, and the connector 35 are attached to the housing 2 and the mover 33.

According to the present embodiment described above, the core exposed portion 74a is provided on the outer peripheral surface 79 of the valve body 7, but is not provided on the first seat surface 77, the second seat surface 78, and the sliding surface 75a. For that reason, when the first seat surface 77 of the valve body 7 closes the inlet passage 11, the sealing property of the inlet passage 11 by the first seat surface 77 can be inhibited from being lowered by the core exposed portion 74a. Further, when the second seat surface 78 of the valve body 7 closes the downstream valve port 25, the sealing property of the downstream valve port 25 by the second seat surface 78 can be inhibited from being lowered by the core exposed portion 74a. Further, when the sliding surface 75a of the valve body 7 slides with respect to the outer wall surface 61a of the shaft portion 61, the deterioration of the sliding property of the valve body 7 due to the core exposed portion 74a can be reduced.

Further, as described above, the core exposed portion 74a is not provided on the seat surfaces 77, 78 and the sliding surface 75a. For that reason, there is no need to perform an additional work after molding in which the outer surface 76 of the valve body 7 is subjected to a finishing work or the like to make the core exposed portion 74a as smooth as the seat surfaces 77, 78 and the sliding surface 75a, and the cost can be reduced by the amount by which the additional work is not performed. In addition, there is no need to perform the gate processing for cutting the gate portion 101 so that burrs such as the gate remaining portion 74 do not remain in the valve body 7.

As described above, the sealing property and the sliding property of the valve body 7 can be enhanced while reducing the number of working steps in manufacturing the valve body 7.

According to the present embodiment, in the valve body 7, the core exposed portion 74a extends annularly around the center line CL. In the above configuration, when the valve body 7 is molded with resin using the mold device 90, the flow of the molten resin is less likely to be disturbed and the uneven shrinkage of the molten resin is less likely to be caused in the portion where the tubular wall portion 72 is molded in the cavity 91. For that reason, unintentional deformation or distortion does not easily occur in the tubular wall portion 72, and the sliding surface 75a can be inhibited from being distorted in the radial direction Y to deteriorate the slidability of the valve body 7. Further, in the above configuration, since the weld is hardly generated in the valve body 7 at the time of resin molding of the valve body 7, the strength of the valve body 7 can be inhibited from being lowered by the weld.

According to the present embodiment, the valve body 7 has the gate remaining portion 74 in which a part of the outer peripheral surface 79 protrudes toward the radially outer side from the seat surfaces 77 and 78, and the core exposed portion 74a is included in the outer surface 76 of the gate remaining portion 74. In the above configuration, when the gate portion 101 is cut in the molded body 100 at the time of manufacturing the valve body 7, a portion separated from the tubular wall portion 72 of the valve body 7 in the gate portion 101 may be cut. This makes it possible to prevent the tubular wall portion 72 of the valve body 7 from being hurt or damaged when the gate portion 101 is cut. In particular, the tubular wall portion 72, which is a connection destination of the gate portion 101, can be prevented from being deformed or melted due to the heat of the laser L.

When the valve body 7 is molded with resin using the mold device 90, if disturbance occurs in the flow of the molten resin at a position close to the gate 92a in the cavity 91, the uneven contraction of the molten resin due to the disturbance tends to occur at a position of the inner peripheral surface 75 of the valve body 7 which is aligned with the gate 92a in the radial direction Y. In contrast, according to the present embodiment, the core exposed portion 74a is provided between the sliding surface 75a and the first seat surface 77 in the axial direction X. In the above configuration, even if the deformation or distortion due to uneven shrinkage of the molten resin is generated in the inner peripheral surface 75, the generation position can be limited to a position between the sliding surface 75a and the first seat surface 77 in the axial direction X. For that reason, the unintentional deformation or distortion is less likely to occur in the sliding surface 75a, and the deterioration of the slidability of the valve body 7 can be reduced.

According to the present embodiment, in the valve body 7 in which the bottom portion 71 forms the second seat surface 78 together with the tubular wall portion 72, the core exposed portion 74a is provided between the sliding surface 75a and the first seat surface 77 in the axial direction X. In the above configuration, when the valve body 7 is molded with resin by using the mold device 90, the molten resin flowing into the cavity 91 from the gate 92a advances in the axial direction X at the portion where the tubular wall portion 72 is molded in the cavity 91, and advances in the radial direction Y after reaching the portion where the bottom portion 71 has been molded. In that case, the flow of the molten resin advancing in the axial direction X is hardly disturbed and the uneven shrinkage of the molten resin is hardly caused in the portion where the tubular wall portion 72 is molded in the cavity 91. Further, in the portion of the cavity 91 where the bottom portion 71 is molded, the flow of the molten resin advancing in the radial direction Y is hardly disturbed, and the uneven shrinkage of the molten resin is hardly caused. Therefore, the unintentional deformation or distortion is less likely to occur in the sliding surface 75a and the second seat surface 78, and the deterioration of the sliding property of the sliding surface 75a and the sealing property of the second seat surface 78 can be reduced.

According to the present embodiment, the core exposed portion 74a is provided at a position separated from the first seat surface 77 in the axial direction X. For that reason, even if the position of the core exposed portion 74a is deviated in the axial direction X at the time of manufacturing the valve body 7, the core exposed portion 74a can be inhibited from being included in the first seat surface 77. As a case where the position of the core exposed portion 74a is deviated in the axial direction X, there is a case where a part of the gate portion 101 is melted and reaches the first seat surface 77 by a heat caused by cutting when the gate portion 101 is cut at the time of manufacturing the valve body 7. As described above, even if the shape, size, and position of the core exposed portion 74a are changed with respect to the gate portion 101 in accordance with the cutting of the gate portion 101, the core exposed portion 74a is hardly included in the first seat surface 77.

According to the present embodiment, in the core exposed portion 74a, the cut surface of the glass fibers 84 mixed in the resin portion 83 of the valve body 7 is exposed. Also, in the present configuration, since the cut surface of the glass fibers 84 is included in the outer peripheral surface 79 of the valve body 7, the deterioration of the sealing property and the sliding property of the valve body 7 due to the cut surface of the glass fibers 84 can be reduced.

According to the present embodiment, the gate portion 101 of the molded body 100 is cut by irradiation with the laser L. This makes it possible to easily cut the gate portion 101 in accordance with the shape of the gate portion 101. For example, in a configuration in which the gate portion 101 extends annularly in the circumferential direction of the valve body 7, cutting can be facilitated so that the cut surface extends annularly along the circumferential direction of the valve body 7.

Second Embodiment

A second embodiment will be described with reference to FIG. 10. In the second embodiment, components denoted by the same reference numerals as those in the drawings according to the first embodiment and the configurations not described are the same as those in the first embodiment, and have the same operation and effects. In the second embodiment, portions different from those of the first embodiment will be described.

Figure 10:
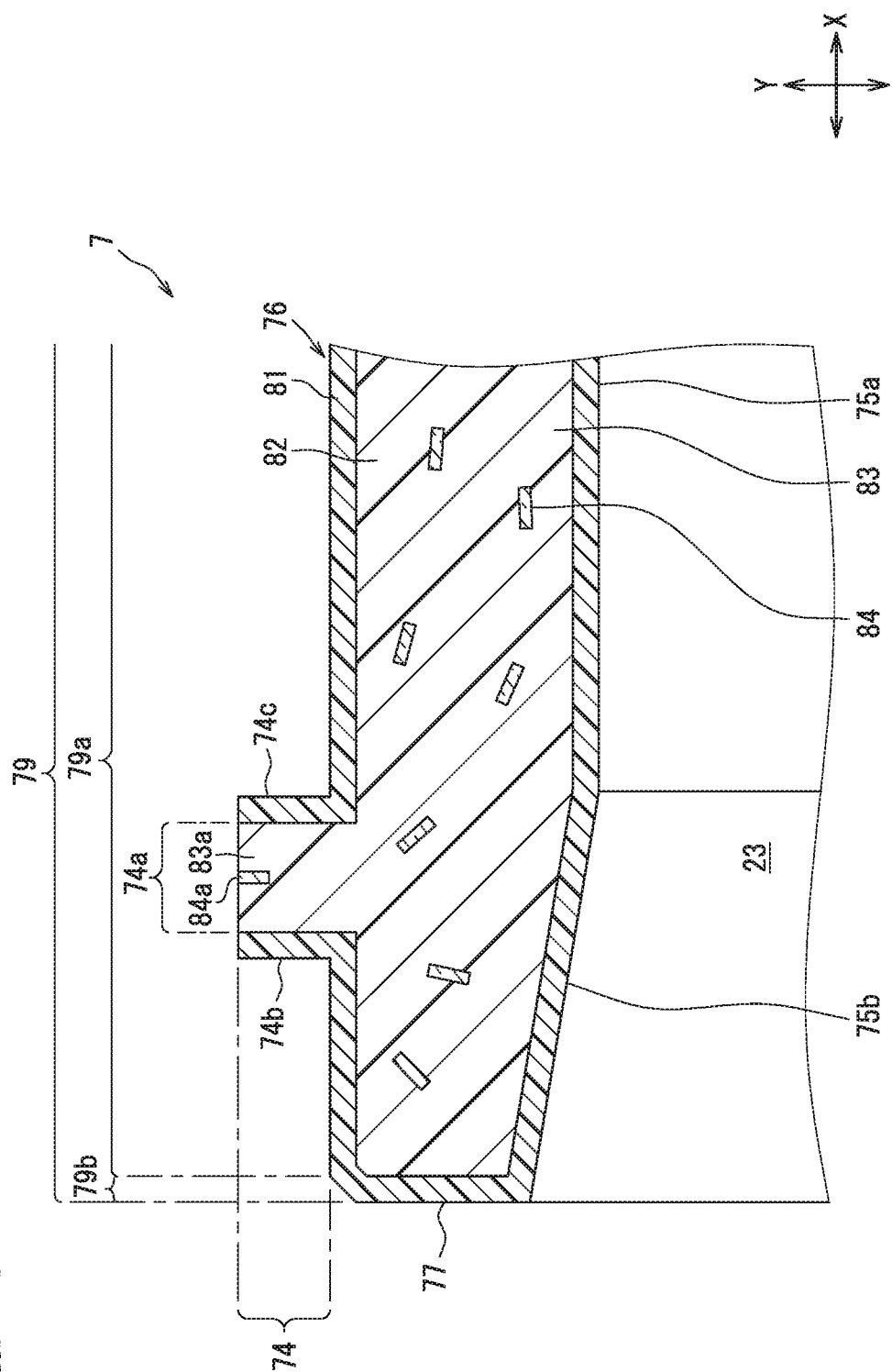
FIG. 10 is an enlarged view of a periphery of a gate remaining portion of a gate according to at least one embodiment.

As shown in FIG. 10, a gate remaining portion 74 according to the present embodiment has a pair of side surfaces 74b and 74c extending in a radial direction Y and a tip end face extending over the side surfaces 74b and 74c, and the tip end face configures a core exposed portion 74a. The pair of side surfaces 74b and 74c are formed by a skin layer 81, and both of the side surfaces 74b and 74c extend toward the radially outer side from a base surface 79a and also extend annularly in a circumferential direction of a valve body 7. In the gate remaining portion 74, the upstream side surface 74b faces a first seat surface 77 in the axial direction X, and the downstream side surface 74c faces a second seat surface 78 in the axial direction X.

In the present embodiment, a gate portion 101 is cut by a cutting tool that mechanically cuts the gate portion 101 at the time of manufacturing the valve body 7. In that case, a heat is hardly applied to the gate portion 101 at the time of cutting the gate portion 101. For that reason, the skin layer 81 disappears in the gate remaining portion 74 due to melting of a part of the gate portion 101, and the melted portion of the gate portion 101 is less likely to spread in the axial direction X. Even in the case where the cutting of the gate portion 101 is performed by a laser L as in the first embodiment, if the skin layer 81 does not disappear, the configuration in which the gate remaining portion 74 has the skin layer 81 is realized.

Third Embodiment

A third embodiment will be described with reference to FIG. 11. In the third embodiment, components denoted by the same reference numerals as those in the drawings according to the first embodiment and the configurations not described are the same as those in the first embodiment, and have the same operation and effects. In the third embodiment, portions different from those of the first embodiment will be described.

Figure 11:
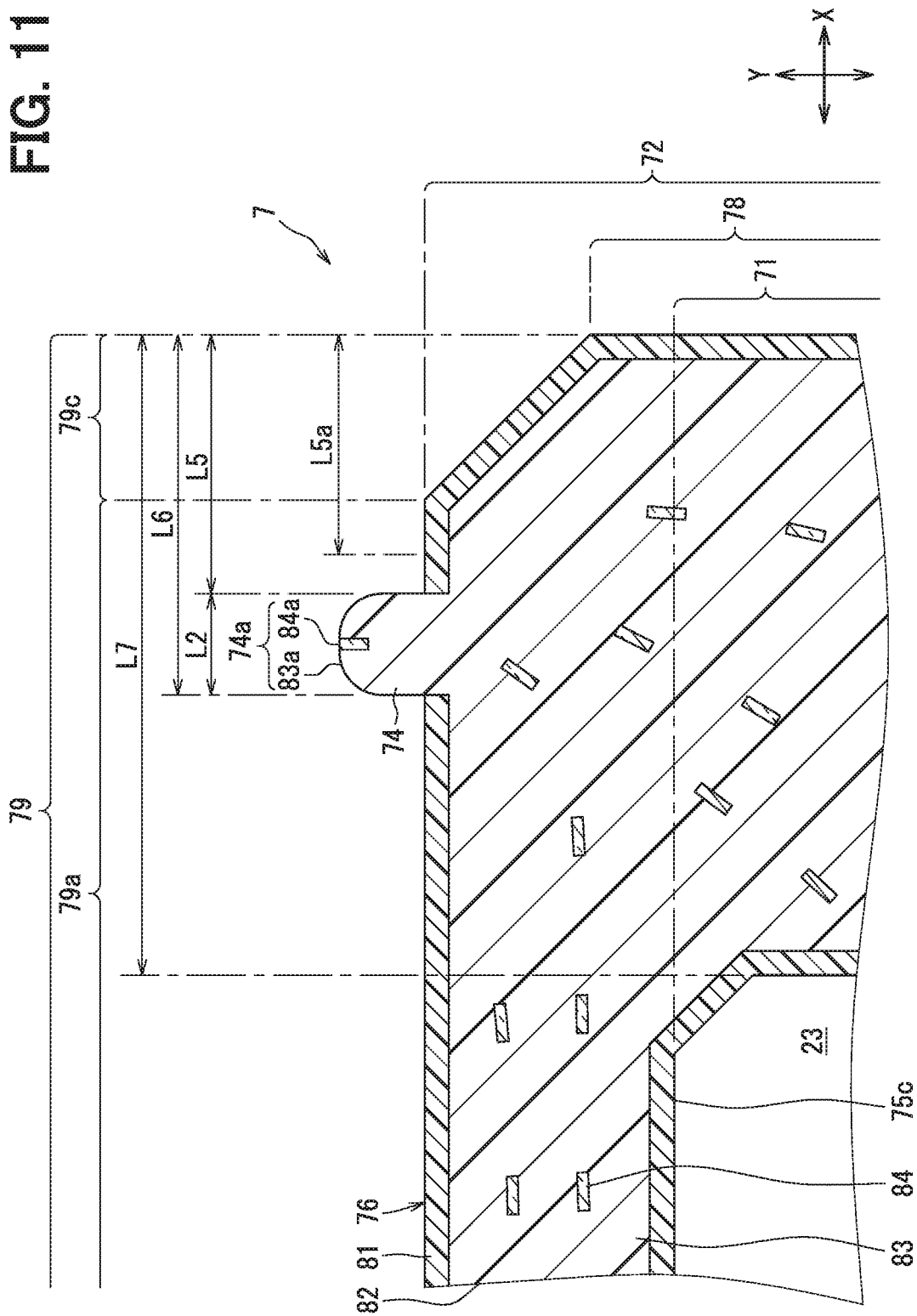
FIG. 11 is an enlarged view of a periphery of a gate remaining portion of a gate according to at least one embodiment.

As shown in FIG. 11, a gate remaining portion 74 and a core exposed portion 74a according to the present embodiment are provided between a sliding surface 75a and a bottom side surface 75c in an axial direction X, so that the gate remaining portion 74 and the core exposed portion 74a are aligned with a bottom portion 71 in a radial direction Y. The gate remaining portion 74 is provided at a position separated from both of a second seat surface 78 and a bottom side surface 75c in the axial direction X. A separation distance L5 between the second seat surface 78 and the gate remaining portion 74 in the axial direction X is equal to or larger than a predetermined distance L5a. The predetermined distance L5a is set to, for example, a value equal to or larger than a length dimension L2 of the gate remaining portion 74 in the axial direction X (for example, 0.2 mm). In that case, the predetermined distance L5a is set to a value that is difficult to reach the second seat surface 78 even if a portion of the gate portion 101 is dissolved when the gate portion 101 is cut during the manufacture of the valve body 7.

In the axial direction X, a separation distance L6 between an upstream end portion of the gate remaining portion 74 and the second seat surface 78 is smaller than a thickness dimension L7 of the bottom portion 71. In that case, the gate remaining portion 74 and the core exposed portion 74a are disposed at a position where a separation distance from the second seat surface 78 in the axial direction X is smaller than the thickness dimension L7 of the bottom portion 71 and is equal to or larger than a predetermined distance L5a. In the outer peripheral surface 79, a virtual region extending from the second seat surface 78 toward the first seat surface 77 by the predetermined distance L5a indicates a gate installation prohibition range in which the installation of the gate portion 101 is prohibited.

In the present embodiment, in a mold device 90, a gate 92a, a bottom portion 71 of a cavity 91, and a portion to be molded are aligned in the radial direction Y. In the above configuration, a flow direction of a molten resin in the portion of the cavity 91 where the bottom portion 71 is molded is easily made uniform in the radial direction Y. In that case, the flow of the molten resin is hardly disturbed in the portion of the cavity 91 where the second seat surface 78 is molded. For that reason, when the molten resin solidifies to form the bottom portion 71 and the second seat surface 78, the shrinkage anisotropy of the molten resin is reduced, so that the bottom portion 71 and the second seat surface 78 are less likely to be bent or deformed.

According to the present embodiment, the core exposed portion 74a is provided at a position separated from the second seat surface 78 in the axial direction X. For that reason, even if the position of the core exposed portion 74a is deviated in the axial direction X at the time of manufacturing the valve body 7, the inclusion of the core exposed portion 74a in the second seat surface 78 can be inhibited. The case where the position of the core exposed portion 74a deviates in the axial direction X includes a case where a part of the gate portion 101 is melted by a heat applied along with the cutting and reaches the second seat surface 78 when the gate portion 101 is cut at the time of manufacturing the valve body 7. In this manner, even if the shape, size, and position of the core exposed portion 74a are changed with respect to the gate portion 101 due to the cutting of the gate portion 101, the core exposed portion 74a is hardly included in the second seat surface 78.

The present disclosure is not limited to the above-described embodiments. The present disclosure includes the above-described embodiments and modification thereof by a skilled person. For example, the present disclosure is not limited to the components or the combinations of elements shown in the embodiments, and can be modified in various modifications. The present disclosure includes an additional portion which can be added to the embodiments. The present disclosure includes a component and an element omitted in the embodiments. The present disclosure includes replacement and combination of components and elements between one and another of the embodiments. The scope of the present disclosure is not limited to the descriptions of the embodiments.

As Modification 1, the core exposed portion 74a may be included in the base surface 79a instead of being included in the outer surface of the gate remaining portion 74. In other words, the valve body 7 may have only the core exposed portion 74a in the gate remaining portion 74 and the core exposed portion 74a. For example, in the first embodiment, the core exposed portion 74a is formed in the same plane as that of the base surface 79a. As a manufacturing method for realizing the above configuration, there is a method of performing a finishing step of removing the gate remaining portion 74 after cutting the gate portion 101 in the molded body 100.

As Modification 2, the gate remaining portion 74 and the core exposed portion 74a may be provided on the outer peripheral surface 79 of the valve body 7 at a position extending across a boundary portion between the upstream chamfered surface 79b and the base surface 79a, or a boundary portion between the downstream chamfered surface 79c and the base surface 79a in the axial direction X. In addition, at least a part of the gate remaining portion 74 and the core exposed portion 74a may be provided in the gate installation prohibition range.

As Modification 3, at least a part of the gate remaining portion 74 and the core exposed portion 74a may be provided at a position aligned with the sliding surface 75a in the radial direction Y. Further, the gate remaining portion 74 and the core exposed portion 74a may be provided at a boundary portion between the outer peripheral surface 79 and the first seat surface 77 or at a boundary portion between the outer peripheral surface 79 and the second seat surface 78 if the gate remaining portion 74 and the core exposed portion 74a are not included in the seat surfaces 77 and 78.

As Modification 4, the chamfered surfaces 79b and 79c of the valve body 7 may not be inclined surfaces extending straight from the base surface 79a, but may be curved surfaces bulging toward the radially outer side or curved surfaces recessed toward the radially inner side. The outer diameter of the second seat surface 78 may not be smaller than the outer diameter of the first seat surface 77.

As Modification 5, the valve body 7 of the third embodiment may have a protruding portion formed by protruding the outer peripheral surface 79, and the gate remaining portion 74 may be provided so as to protrude further toward the radially outer side from the protruding portion. In the third embodiment, the gate remaining portion 74 may be provided between the sliding surface 75a and the bottom portion 71 on the outer peripheral surface 79 in the axial direction X.

As Modification 6, the gate remaining portion 74 and the core exposed portion 74a may not be annularly formed. In other words, the gate 92a which is a film gate in the mold device 90 does not need to be annular. For example, since the gate 92a is a pin gate, the gate remaining portion 74 may extend in a columnar shape from the base surface 79a toward the radially outer side of the valve body 7.

As Modification 7, in the molded body 100, multiple gate portions 101 connected to the valve body 7 may be provided. In other words, multiple gate remaining portions 74 and multiple core exposed portions 74a may be provided on the outer peripheral surface 79 of the valve body 7. For example, in the outer peripheral surface 79, the gate remaining portions 74 may be provided at a position between the sliding surface 75a and the first seat surface 77 in the axial direction X, and at a position between the sliding surface 75a and the second seat surface 78.

As Modification 8, the working fluid flowing through the electromagnetic valve 1 may be a liquid having a high viscosity in addition to oil.

As Modification 9, a sealing member such as an O-ring seal may be mounted on the outer periphery of the tubular end portion 2a in order to reduce the leakage of fluid from a space between the outer surface of the housing 2 and the inner surface of the mounting hole 52. For example, the O-ring seals are provided at a position on the tip side of the outflow port 12 and at a position on the rear end side of the outflow port 12. The O-ring seal is a rubber-made member having a circular cross section, and the O-ring seal is fitted into a groove provided in the entire circumference of the tubular end portion 2a. The sealing member may be made of an elastically deformable material other than rubber, and may have a rectangular cross-sectional shape.

As Modification 10, the number and shape of the pressure release passage 13 is not limited if the pressure release passage 13 is provided at a position other than the portion in which the shaft 4 comes in contact at the bottom portion 71. The pressure release passage 13 may have a rectangular, circular, arcuate, or slit cross-sectional shape. The portion of the valve body 7 pressed by the shaft 4 does not have to be the bottom portion 71. For example, a partition portion may be pressed by the shaft 4, which is provided at a position in the valve body 7 spaced from the second seat surface 78 toward the first seat surface 77, and divides the internal chamber 23 of the valve body 7 into an upstream side and a downstream side.

As Modification 11, the control valve does not have to be the electromagnetic valve 1 having the electromagnetic solenoid unit 3 as a drive unit as long as the control valve is configured so that the inlet passage 11 and the downstream valve port 25 can be opened and closed by the first seat surface 77 and the second seat surface 78 of the valve body 7. For example, a control valve having a drive unit including a piezoelectric element or a drive unit using a hydraulic pressure as a driving source may be used as a drive unit for opening and closing the valve body 7.

(Overview)

A control valve switches between a downstream passage and a drain passage as an outflow destination of the working fluid which has flowed into a valve chamber from an upstream passage. The control valve has a valve body that is slidably supported by a support portion in a valve chamber. The valve body slides relative to the support portion so as to move to a first position at which an inlet passage leading to the valve chamber is closed to prevent a flow of the working fluid from the upstream passage to the valve chamber, and a second position at which a valve port provided in the valve chamber is closed to prevent the flow of the working fluid from the valve chamber to the drain passage. An outer surface of the valve body includes a seat surface that closes the inlet passage, a seat surface that closes the valve port, and a sliding surface that slides on an outer peripheral surface of the support portion.

When the valve body is molded with resin using a mold device such as a mold, in the mold device, molten resin is supplied from a gate to a cavity in which the valve body is molded. The molded body molded by the mold device includes, in addition to the valve body, a portion where the molten resin remaining on the gate has solidified, which is a gate portion connected to the valve body, and the valve body is removed from the molded body by cutting the gate portion. In that case, a part of the gate portion may remain in the valve body as a trace of the cut of the gate portion.

When the molded body molded with resin has a skin layer molded by an inner peripheral surface of the mold device and a core layer provided under the skin layer, a most part of the surface of the valve body is a smooth surface formed by the skin layer. On the other hand, it is expected that the core layer is exposed at a portion where the gate portion remains in the valve body and does not have a smooth surface. For that reason, when the remainder of the gate portion is on a seat surface or sliding surface, there is a concern that a sealing property of the inlet passage and the valve port by the valve body and a sliding property of the valve body with respect to the support portion are lowered by those of the remainder of the gate portion.

According to a control valve and a method of manufacturing the control valve of the present disclosure, a sealing property and a sliding property of the valve body can be improved while the number of working steps in manufacturing a valve body can be reduced.

According to a first aspect of the present disclosure, a control valve controls a flow of a working fluid. The control valve includes a housing, an inlet passage, a valve body and a support member. The housing includes a tubular end portion inserted into a mounting hole of a passage formation member, a drain passage through which the working fluid is discharged from the housing to an outside of the passage formation member, and a valve chamber inside the tubular end portion. The passage formation member has an upstream passage through which the working fluid flows toward the housing, and a downstream passage into which the working fluid flows out of the housing. The inlet passage is provided inside the tubular end portion, and the upstream passage communicates with the valve chamber through the inlet passage. The valve body has a tubular shape, is provided in the valve chamber and is movable in an axial direction along which a center line of the valve body extends. The valve body includes a first seat surface which is one end face for closing the inlet passage, and a second seat surface which is another end face for closing a valve port communicating with the valve chamber. The valve body is movable between a first position at which the first seat surface closes the inlet passage to block a flow of the working fluid into the valve chamber from the upstream passage and a second position at which the second seat surface closes the valve port to block the flow of the working fluid into the drain passage from the valve chamber. The support member includes a fixed portion fixed to an inner side of the tubular end portion and having the inlet passage extending through the fixed portion, and a support portion extending downstream from the fixed portion and supporting the valve body to be slidable in the axial direction. An inner peripheral surface of the valve body has a sliding surface that slides on an outer peripheral surface of the support portion. An outer peripheral surface of the valve body has a connection surface which connects the first seat surface and the second seat surface. The valve body, which is a resin molded product, includes a skin layer providing the outer peripheral surface of the valve body and a core layer under the skin layer. The valve body includes a core exposed portion where the core layer is exposed without being covered with the skin layer and forms a part of the outer peripheral surface of the valve body. The core exposed portion is provided on the connection surface without being provided on the first seat surface, the second seat surface, and the sliding surface.

According to the first aspect, in the resin molded valve body, the core exposed portion is provided on the connection surface, while the core exposed portion is not provided on the first seat surface, the second seat surface, and the sliding surface. This makes it possible to inhibit that the sealing property of the inlet passage by the first seat surface is lowered by the core exposed portion when the valve body is at the first position, and that the sealing property of the valve port by the second seat surface is lowered by the core exposed portion when the valve body is at the second position. In addition, when the sliding surface of the valve body slides with respect to the outer peripheral surface of the support portion, the deterioration of the sliding property of the valve body due to the core exposed portion of the connection surface can be reduced.

When a valve body is manufactured by resin molding using a mold device such as a mold, it is assumed that a trace of cutting a gate portion connected to the valve body remains on the valve body, and the core exposed portion is formed by the trace. On the other hand, as described above, the core exposed portion is provided on the connection surface, and is not provided on the first seat surface, the second seat surface, and the sliding surface. For that reason, there is no need to perform a work of making the core exposed portion as smooth as the first seat surface, the second seat surface, and the sliding surface by finishing the outer surface of the valve body or the like.

As described above, the sealing property and the sliding property of the valve body can be improved while the number of working steps in manufacturing the valve body can be reduced.

According to a second aspect of the present disclosure, in a method for manufacturing a control valve that controls a flow of a working fluid, a mold device including a cavity and a gate connected to the cavity is prepared. A molded body is molded by supplying molten resin from the gate to the cavity in the mold device. The molded body includes a tubular or columnar valve body having a first seat surface which is one end face of the valve body, a second seat surface which is another end face of the valve body, a connection surface connecting the first and second seat surfaces on an outer surface, and a sliding surface on an inner peripheral surface. The molded body includes a gate portion where the molten resin remaining in the gate has solidified, the gate portion being connected to the connection surface without being connected to the first seat surface, the second seat surface and the sliding surface. The gate portion is cut off from the molded body to obtain the valve body with a gate trace remaining on the connection surface due to the cutting of the gate portion. A support member having a support portion and an inlet passage is prepared. A housing having a valve chamber and a drain passage communicating with the valve chamber is prepared. The support member is attached to the housing such that the inlet passage communicates with the valve chamber and that the sliding surface is slidable in an axial direction of the valve body on an outer peripheral surface of the support portion in the valve chamber in a state where the support portion is inserted into an interior of the valve body. A drive unit that moves the valve body in the axial direction is prepared. The drive unit is attached to the housing such that the valve body is movable between a first position at which the first seat surface closes the inlet passage and a second position at which the second seat surface closes the drain passage.

According to the second aspect, after the molded body is molded by using the mold device, the gate portion is cut. The gate trace, which is a trace of cutting the gate portion, remains on the connection surface of the valve body, but does not remain on the first seat surface, the second seat surface, or the sliding surface. For that reason, similarly to the first aspect, the sealing property and the sliding property of the valve body can be improved while the number of working steps in manufacturing the valve body can be reduced.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A control valve that controls a flow of a working fluid, comprising:
a housing that includes a tubular end portion inserted into a mounting hole of a passage formation member, a drain passage through which the working fluid is discharged from the housing to an outside of the passage formation member, and a valve chamber inside the tubular end portion, the passage formation member having an upstream passage through which the working fluid flows toward the housing, and a downstream passage into which the working fluid flows out of the housing;
an inlet passage provided inside the tubular end portion, the upstream passage communicating with the valve chamber through the inlet passage;
a valve body having a tubular shape, provided in the valve chamber and movable in an axial direction along which a center line of the valve body extends, the valve body including a first seat surface which is one end face for closing the inlet passage, and a second seat surface which is another end face for closing a valve port communicating with the valve chamber, the valve body being movable between a first position at which the first seat surface closes the inlet passage to block a flow of the working fluid into the valve chamber from the upstream passage and a second position at which the second seat surface closes the valve port to block the flow of the working fluid into the drain passage from the valve chamber; and
a support member that includes a fixed portion fixed to an inner side of the tubular end portion and having the inlet passage extending through the fixed portion, and a support portion extending downstream from the fixed portion and supporting the valve body to be slidable in the axial direction, wherein
an inner peripheral surface of the valve body has a sliding surface that slides on an outer peripheral surface of the support portion,
an outer peripheral surface of the valve body has a connection surface which connects the first seat surface and the second seat surface,
the valve body, which is a resin molded product, includes a skin layer providing the outer peripheral surface of the valve body and a core layer under the skin layer,
the valve body includes a core exposed portion where the core layer is exposed without being covered with the skin layer and forms a part of the outer peripheral surface of the valve body, and
the core exposed portion is provided on the connection surface without being provided on the first seat surface, the second seat surface, and the sliding surface.

2. The control valve according to claim 1, wherein the core exposed portion extends annularly about the center line.

3. The control valve according to claim 1, wherein
the valve body has a projection portion which is a part of the connection surface protruding outward of both the first seat surface and the second seat surface in a direction orthogonal to the axial direction, and
the core exposed portion is on an outer surface of the projection portion.

4. The control valve according to claim 1, wherein the core exposed portion is positioned on the connection surface between the sliding surface and the first seat surface in the axial direction.

5. The control valve according to claim 4, wherein
the valve body includes
a tubular wall portion forming the sliding surface and the connection surface, and
a bottom portion forming the second seat surface together with the tubular wall portion.

6. The control valve according to claim 1, wherein the core exposed portion is positioned on the connection surface between the sliding surface and the second seat surface in the axial direction.

7. The control valve according to claim 1, wherein the core exposed portion is provided at a position on connection surface away from each of the first seat surface and the second seat surface.

8. The control valve according to claim 1, wherein
the valve body has a resin portion and a glass fiber mixed as a filler with the resin portion, and
a cut surface of the glass fiber is exposed in the core exposed portion.

9. A control valve that controls a flow of a working fluid, comprising:
a housing including a tubular end portion, a valve chamber inside the tubular end portion, an outflow port through which the working fluid flows out of the valve chamber, and a drain passage through which the working fluid is discharged from the valve chamber;
a support member including a fixed portion fixed to an inner side of the tubular end portion and having an inlet passage that extends through the fixed portion and allows the working fluid to flow therethrough into the valve chamber, and a support portion protruding from the fixed portion into the valve chamber; and
a valve body provided in the valve chamber and having a tubular shape into which the support portion is inserted, the valve body including a first seat surface on one end face of the valve body, and a second seat surface on another end face of the valve body; wherein
an inner surface of the valve body is slidable on the support portion in an axial direction of the valve body between a first position at which the first seat surface contacts the support portion to close the inlet passage and a second position at which the second seat surface contacts the housing to close the drain passage,
the valve body, which is a resin molded product, includes a skin layer forming an outer surface of the valve body, and a core layer under the skin layer, and
the outer surface of the valve body includes a core exposed portion where the core layer is exposed without being covered with the skin layer.

* * * * *